US012515122B2

(12) United States Patent
Kamfjord

(10) Patent No.: US 12,515,122 B2
(45) Date of Patent: Jan. 6, 2026

(54) CONTROLLING A DISPLAY OF A COMPUTER DEVICE

(71) Applicant: KING.COM LIMITED, St. Julians (MT)

(72) Inventor: Par Kamfjord, Stockholm (SE)

(73) Assignee: KING.COM LIMITED, St. Julians (MT)

( * ) Notice: Subject to any disclaimer, the term of this patent is extended or adjusted under 35 U.S.C. 154(b) by 602 days.

(21) Appl. No.: 15/939,488

(22) Filed: Mar. 29, 2018

(65) Prior Publication Data

US 2019/0299093 A1 Oct. 3, 2019

(51) Int. Cl.
*A63F 13/45* (2014.01)
*A63F 3/00* (2006.01)
*A63F 13/23* (2014.01)
*G06F 3/04842* (2022.01)

(52) U.S. Cl.
CPC .......... *A63F 13/23* (2014.09); *A63F 3/00643* (2013.01); *A63F 13/45* (2014.09); *G06F 3/04842* (2013.01)

(58) Field of Classification Search
CPC .......... A63F 13/00; A63F 13/45; A63F 13/23; A63F 3/00643; G06F 3/04842
See application file for complete search history.

(56) References Cited

U.S. PATENT DOCUMENTS

| 2014/0080560 | A1* | 3/2014 | Knutsson | G07F 17/32 463/10 |
| 2014/0235338 | A1* | 8/2014 | Hansson | G07F 17/32 463/31 |

* cited by examiner

*Primary Examiner* — Robert E Mosser
(74) *Attorney, Agent, or Firm* — Holzer Patel Drennan

(57) ABSTRACT

A computer device having a user interface displaying an initial game board comprising user actuatable game elements and detecting user input when a user engages with a game element, to display a path follower element in an initial location. A detected user input of a user move is received and on detecting a match game condition the user interface is controlled to remove the game elements from the display, and replacement game elements are displayed. Events are detected which interact with the path follower element arising as a result of the user move and a number of moving steps are allocated to the path follower element based on the detected events.

18 Claims, 15 Drawing Sheets

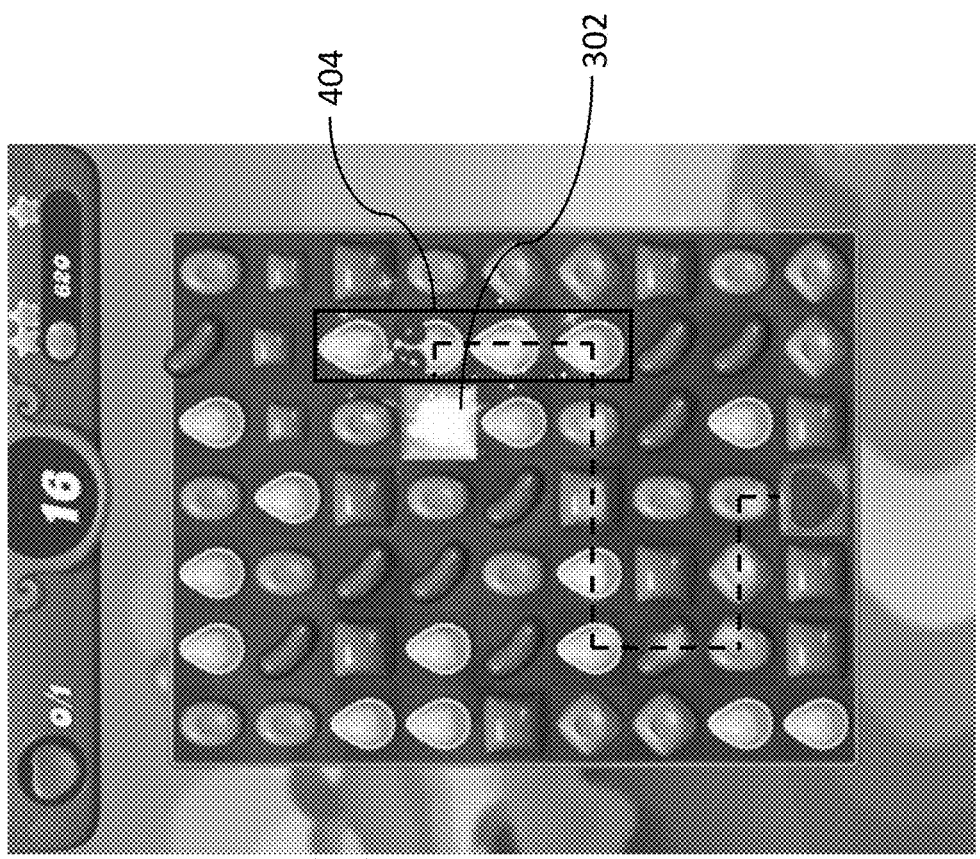
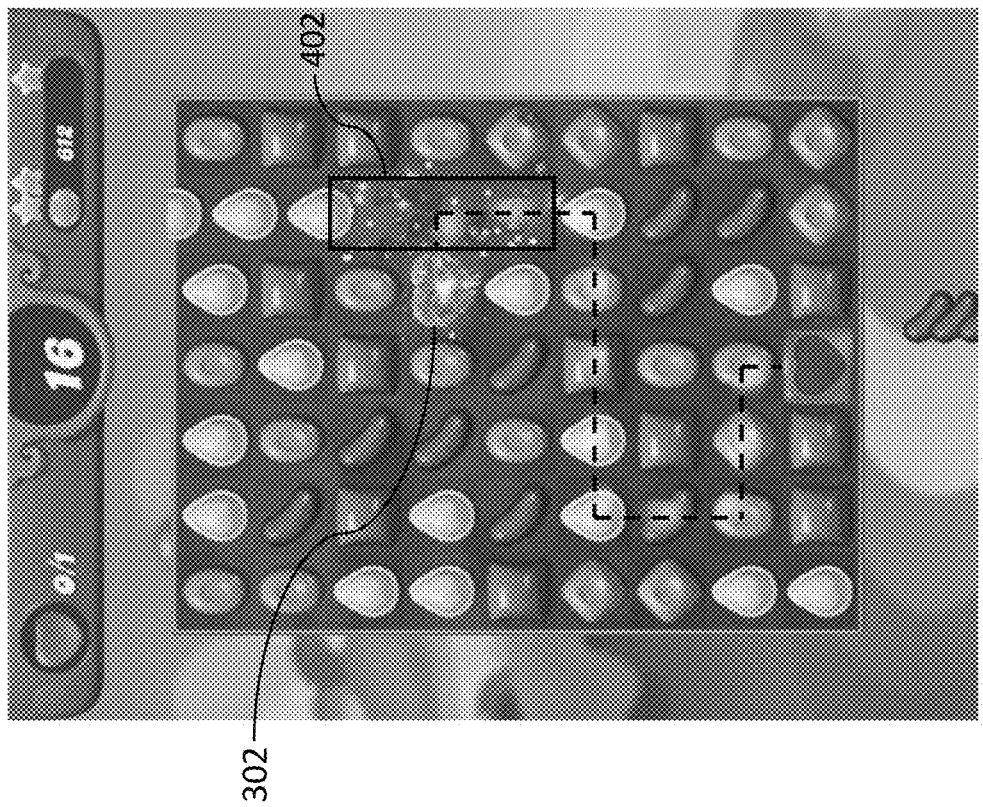
Figure 4A
Figure 4B

CONTROLLING A DISPLAY OF A COMPUTER DEVICE

FIELD OF THE INVENTION

The disclosure relates to controlling a user interface of a computer device, and to a computer device.

BACKGROUND OF THE INVENTION

There are multiple technical challenges facing the designer of computer-implemented games to create a fun and compelling game. Three of these challenges can be broadly categorised into the following areas: 'engagement', 'viralisation' and 'monetisation'.

We will look at 'engagement', which involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce players' sense of success and accomplishment.

One technical area where there are particular challenges in controlling the display of a computer device is in the design of computer-implemented games. Not only is there a requirement to create fun and compelling games, these games need to be delivered to a player in a seamless and engaging fashion, while adhering to complex game rules.

There are technical challenges in providing gameplay which is engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce players' sense of success and accomplishment.

An existing type of match-three game is a so-called "switcher" game. A match-three game is a type of casual puzzle game where the player is required to find patterns on a seemingly chaotic board. The player then has to match three or more of the same type of game element on the game board and those matched elements will then disappear. In a switcher game, the player switches the places of adjacent game elements on the game board so that one or both of them create a chain of at least three adjacent game elements of the same type. Those matched game elements will then disappear. The game board is then repopulated with replacement game elements.

One such known match three-type game is known by the trade name Candy Crush. In that game, the game board is repopulated with game elements selected based on random seeding which are perceived as falling downwards (or upwards) onto the game board from the top (or bottom) edge of the screen from which the game is played.

SUMMARY OF THE INVENTION

According to an aspect of the present invention there is provided a computer device having:

a user interface configured to display an initial game board comprising user actuatable game elements and to detect user input when a user engages with a game element, the user interface further configured to display a path follower element in an initial location;

a processor configured to receive a detected user input of a user move and on detecting a match game condition of at least three adjacent matching user actuatable game elements to control the user interface to remove the at least three game elements from the display and provide on the user interface replacement user actuatable game elements wherein the processor is configured to detect events which interact with the path follower element arising as a result of the user move and to allocate a number of moving steps to the path follower element based on the detected events, the processor further configured to process the moving steps of the path follower element to cause the path follower element to move along a predetermined path, the processor configured for processing each step, to cause the path follower element to move to a next location along the path, to remove from that location any game element at that location, to determine if there are any remaining moving steps allocated to the path follower element and (i) if so, to process the next step or (ii) if not, to display the path follower element at its attained location.

The processor may be configured, for processing each step, to display the path follower element at each next location prior to the attained location.

It is possible to configure the processor to determine, for each game element removed from that locaiton, whether it is associated with a triggered effect and, if so, to trigger that effect prior to the next step.

The processor may be configured to determine if the game element removed from that location of the path follower element is associated with an effect to be triggered. If so, the processor may be configured to trigger that effect and to detect any further events which interact with the path follower element after the effect has been triggered. If there are such further detected events the processor may be configured to allocate a further number of moving steps to the path follower element to be processed prior to establishing the next game board ready for a next user move.

In embodiments, the processor may be configured to select a replacement user actuatable game element to be generated on the display in a space left by the path follower element after its move to its next location.

It may be possible to configure the processor to provide the replacement user actuatable game elements by a refill mechanism in which game elements adjacent to the locations of the removed at least three game elements in a direction determined by a predefined physics move into the spaces left after removal of the game elements, and replacement user actuatable game elements are refilled from an edge of the game board according to the predetermined physics.

The processor may be configured to determine whether the game element removed from the path follower element's current location is associated with an effect to be triggered after the replaced game element has been generated in the space left by the path follower element, to trigger the effect if such an effect is detected, to detect any match game conditions created as a result of triggering the effect, to remove adjacent matching user actuatable game elements of the detected match game condition and to provide replacement user actuatable game elements using a refill mechanism prior to processing the next allocated step of the path follower element.

In embodiments, an interacting event may comprise a match game condition of user actuatable game elements, at least one of which is adjacent the path follower element.

It may be that the interacting event is created by game code executed by the processor which generates a direct interaction with the path follower element at its current location.

In embodiments, there may be a counter which records the number of moving steps allocated to the path follower element as a result of the user move, and which is decremented each time the processor processes a step.

It may be possible to configure the processor to allocate a number of moving steps to the path follower element corresponding to a count of the detected events.

The number of moving steps allocated to the path follower element may be calculated based on the type and number of event, wherein events of different types have different weights contributing different amounts to the allocated number of moving steps.

It may be possible to configure the processor to apply a cap to the number of steps allocatable to the path follower element per user move.

The processor may be configured to access a maximum number of steps allocatable to the path follower element, and to display the path follower element at its location attained after the maximum number of steps, if the number of allocate steps exceeds the maximum number.

In embodiments, the processor may be configured to render the predetermined path so as to be visually apparent on the user interface.

It may be possible to configure the processor to change the visual appearance of the path follower element when subject to an interacting event.

The user interface may be configured to display a target element at an endpoint location of the predetermined path.

In a second aspect of the invention there is provided a computer implemented method of controlling a user interface on a computer device responsive to user engagement with a displayed initial game board comprising user actuatable game elements and a path follower element displayed in an initial location, the method comprising the following steps implemented by a processor of the computer device: receiving a detected user input of a user move; detecting a match game condition of at least three adjacent matching user actuatable game elements; controlling the user interface to remove the at least three game elements from the display; providing on the user interface replacement user actuatable game elements; detecting events which interact with the path follower element arising as a result of the user move; allocating a number of moving steps to the path follower element based on the detected events; processing the moving steps of the path follower element to cause the path follower element to move along a predetermined path, by for each step: causing the path follower element to move to a next location along the path; removing from that location any game element at that location, determining if there are any remaining moving steps allocated to the path follower element and: (i) if so, processing the next step; or (ii) if not, displaying the path follower element at its attained location.

In a third aspect of the invention there is provided a computer readable medium having instructions which when executed by a processor on a computer device cause the processor to: receive a detected user input of a user move; detect a match game condition of at least three adjacent matching user actuatable game elements; control the user interface to remove the at least three game elements from the display; provide on the user interface replacement user actuatable game elements; detect events arising as a result of the user move which interact with a path follower element displayed at an initial location on a user interface of the computer device; allocate a number of moving steps to the path follower element based on the detected events; process the moving steps of the path follower element to cause the path follower element to move along a predetermined path, by for each step: causing the path follower element to move to a next location along the path; removing from that location any game element at that location, determining if there are any remaining moving steps allocated to the path follower element and: (i) if so, processing the next step; or (ii) if not, displaying the path follower element at its attained location.

The game mechanic offered by the path follower element is unique in that each step of the path follow element is processed as it moves along the predetermined path. In one embodiment, the processing of each step by the processor can determine whether any removed game element is associated with a triggered effect, and if so can trigger that effect prior to the next step. This allows for the possibility of interesting and engaging effects to occur for the user. One of the particularly interesting features of the game known as Candy Crush is the availability of special game elements which may have special effects associated with them. For example, a game element might have a different visual appearance to indicate that it is associated with a special effect. Special effects include line blasters, bomb blasters, fish and other features. A lime blaster removes a row or a column of a grid array of game elements. A bomb blast removes a set of adjacent game elements, the number in the set depending on the size of the bomb blast. A fish which is triggered can travel over the game board with the visual appearance of swimming and can cause game elements with matching characteristics to the fish to be removed. For example, a yellow fish may cause yellow game elements to be removed. If such effects are triggered after the processing of a step of the path follow element, this may cause further game elements to be removed and replaced using a refill mechanism. The replacement of game elements may cause further events which interact with the path follower element to occur. In that case, the further moving steps may be allocated to the path follower element as a result of such interacting elements. Thus, a particularly interesting and engaging sequence of effects can be presented to a user, after which the path follower element may have attained a new location in a next game board which is offered to the user for their next move.

In Candy Crush, replacement user actuatable game elements are provided using a refill mechanism in which game elements above the locations of the removed elements move into the spaces left after removal of the game elements, and further replacement game elements are re-filled from an edge of the game board according to a predetermined physics. That is, they may fall down into the board or move upwards into the board for example. According to one embodiment of the present invention, spaces left by the path follower element as it takes steps along the path are not refilled in this way. Instead, as part of the processing of the step of the path follower element, a new replacement game element is generated on the display in a space left by the path follower element after it has moved to its next location. That is, as the path follower element moves step-by-step, new game elements are spawned in the spaces left behind. Such game elements may be selected so that they do not cause further chain reactions in that particular move. That is, the processor may be configured to determine the type of game elements surrounding the space to be filled and to deselect matching game elements from filling that space. Instead, nonmatching game elements are selected. The replacement game elements may or may not be special game elements associated with triggerable special effects.

The computer device may comprise a counter which records the number of moving steps allocated to the path follower element as a result of the user move, and which is decremented each time the path follower element takes a step. The number of moving steps may be allocated corresponding to a count of the detected events. Alternatively, the number of moving steps may be calculated based on the type and number of events, wherein events of different types have different weights contributing different amounts to the allocated number of moving steps.

Events which interact with the path follower element may comprise a match game condition of user actuatable game elements at least one of which is adjacent the path follower element. This match game condition may result from a user's move. Alternatively, a match game condition which constitutes an interacting event may occur in a chain reaction following a refill of the board or triggering of effects as a result of movement of the path follower element. In some embodiments such match game conditions may contribute to the allocated number of moving steps. In other embodiments it may be decided that they should not contribute to the allocation of moving steps.

Interacting events may alternatively or additionally comprise events which generate direct interaction with the path follower element at its current location. Such interacting events are created by game code executed by the processor, for example by the implementation of special features such as line blasts, bomb blasts or fish. Effects which are triggered following the refill which immediately follows the user move on the initial game board may contribute to the allocation of moving steps. In some embodiments interacting events which occur in a chain reaction after movement of the path follower element may or may not contribute to the allocation of moving steps. The number of steps by which the path follower element may move responsive to a user move may be subject to a maximum number. In that case, the path follower element moves to its location attained after the maximum number of steps, or the allocated number of steps, whichever is the smaller.

The predetermined path may be rendered so as to be visually apparent on the user interface. Alternatively, it may be invisible to a player.

The visual appearance of the path follower element may change when subject to an interacting event. The visual appearance may depend on the number of interacting events.

The user interface may be configured to display a target element at an end point location of the predetermined path. A game objective may be to move the path follower element to the target element. In that case, when the target element is reached a user detectable effect may be provided such as generating a reward, changing the visual appearance of the path follower element and/or the target element, or removing the target element from the display.

Note that after each step has been processed, the game board may reach a stable state in which a replacement game element has spawned behind the path follower object, the game element at the location of the path follower object has been removed and replaced by the path follower object, and any matching game elements have been removed and replaced by the refill mechanism. At this point the game board may be considered stable, but may not yet be ready for the user's next move. Instead, it is determined whether or not the game element removed by the path follower element has triggered an effect. If it has, that effect is put into play and there may be a further chain reaction before the board stabilises again. This carries on until the path follower element has reached the end of its allocated number of steps for that move, or the maximum number of steps allocated to a move. Only then is the next game board offered to the user for their next move.

DESCRIPTION OF THE DRAWINGS

FIGS. 4A and 4B illustrate an example interacting event comprising a match occurring in tiles adjacent to the path follower element and the resulting refill;

DETAILED DESCRIPTION OF THE INVENTION

The terms user and player are used interchangeably throughout this document and no specific meaning is intended using one or the other unless the context suggests otherwise.

In the following description of various implementations of the invention, reference is made to the accompanying drawings which form part thereof, and in which is shown by way of illustration various implementations in which the invention may be utilized. It is to be understood that the other implementations may be utilized, and structural and functional modifications may be made without departing form the scope of the present invention.

Figure 1:
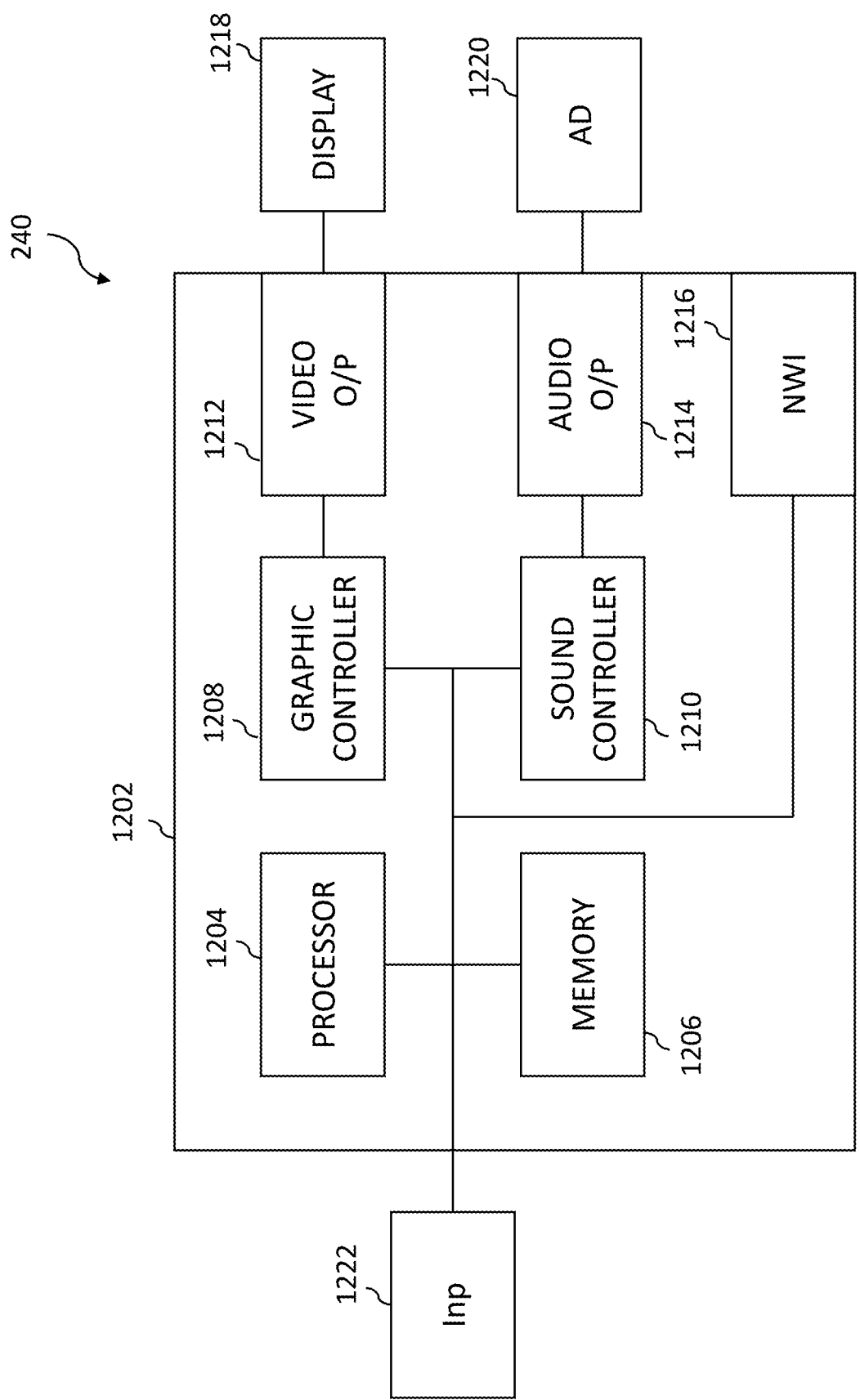
FIG. 1 shows a schematic view of a user device.

A schematic view of a user or computing device 240 according to an embodiment is shown in FIG. 1. The user device has a controller 1202. The controller 1202 may have one or more processors 1204 and one or more memories 1206. The controller 1202 is also shown as having a graphics controller 1208 and a sound controller 1210. It should be appreciated that one or other or both of the graphics controller 1208 and sound controller 1210 may be provided by the one or more processors 1204. Other functional blocks may also be implemented by suitable circuitry or computer code executed by the one or more processor 1204.

The graphics controller 1208 is configured to provide a video output 1212. The sound controller 1210 is configured to provide an audio output 1214. The controller 1202 has an interface 1216 allowing the device to be able to communicate with a network such as the Internet or other communication infrastructure.

The video output 1212 may be provided to a display 1218. The audio output 1214 may be provided to an audio device 1220 such as a speaker and/or earphone(s).

The device 240 may have an input device 1222. The input device 1222 can take any suitable format such as any one or more of a keyboard, mouse, touch screen, joystick or game controller. It should be appreciated that the display 1218 may in some embodiments also provide the input device 1222, for example, by way of an integrated touch screen.

The blocks of the controller 1202 are configured to communicate with each other via an interconnect such as a bus or any other suitable interconnect and/or by point to point communication.

It should be appreciated that in some embodiments, the controller 1202 may be implemented by one or more integrated circuits, at least in part.

Figure 2:
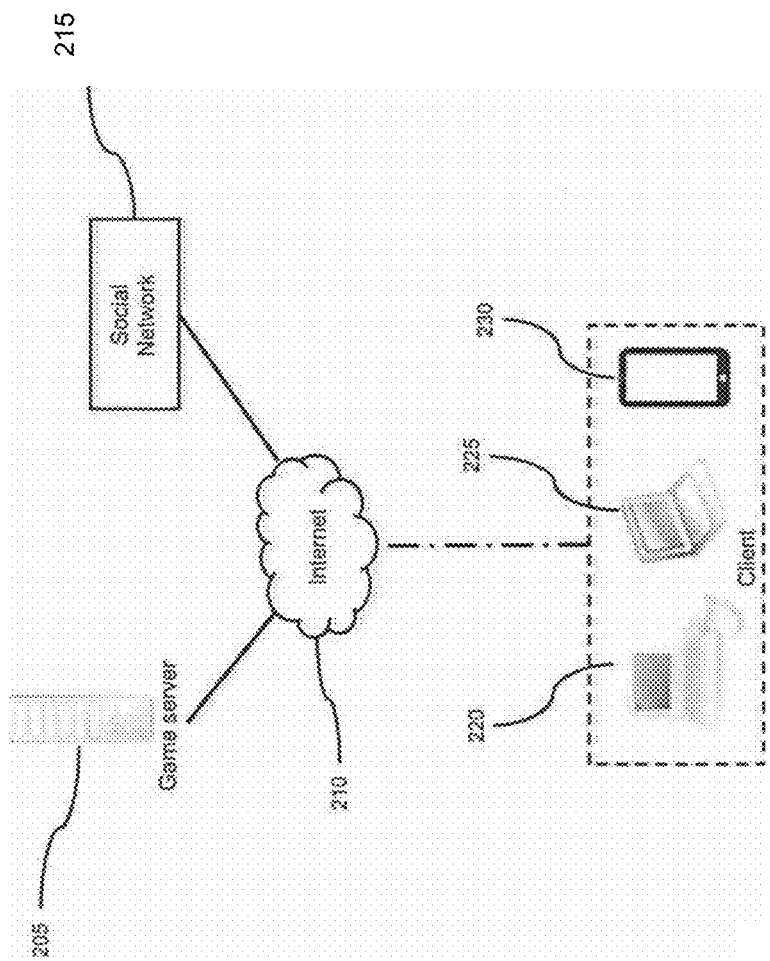
FIG. 2 shows an exemplary computer environment.

FIG. 2 portrays an exemplary overall environment in which the present invention can be utilized. A virtual game is stored on for instance a game server 205. The virtual game is to be played on a client device 240, such as a computer 220, 225 or a smartphone or other handheld device 230. The client device 240 can also be a kiosk, arcade gaming station, smart TV or other device with computing capabilities, input devices and a screen that can present the game to a user. The client device communicates with the game server 205 and a social network server 215, for instance through the Internet 210 or other network. It should be understood that the social network server 215 and the game server 205 do not have to be located in different places, they could be on the same server or on a plurality of servers located in different locations. People skilled in the art will understand that other devices than the exemplary ones listed can also be used without departing from the spirit and scope of the invention.

The techniques described in this patent can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone, etc.) to enable the client to render and display graphics and sounds; this 'web services' approach is increasingly common.

Another aspect is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance or to game information related to a social network to which the game is connected. It is possible to gather this data, store it and make use of it for instance to improve the game.

In the following description, the terms 'game element' and 'game object' are used interchangeably. A user actuatable game object or element is one whose location on the board can be affected by a user who interacts with it. A game board may consist of user actuatable objects and non user actuatable objects.

One such object described herein is a path follower object.

Referring to FIGS. 3-10, example implementations of the path follower game object are shown.

Figure 3:
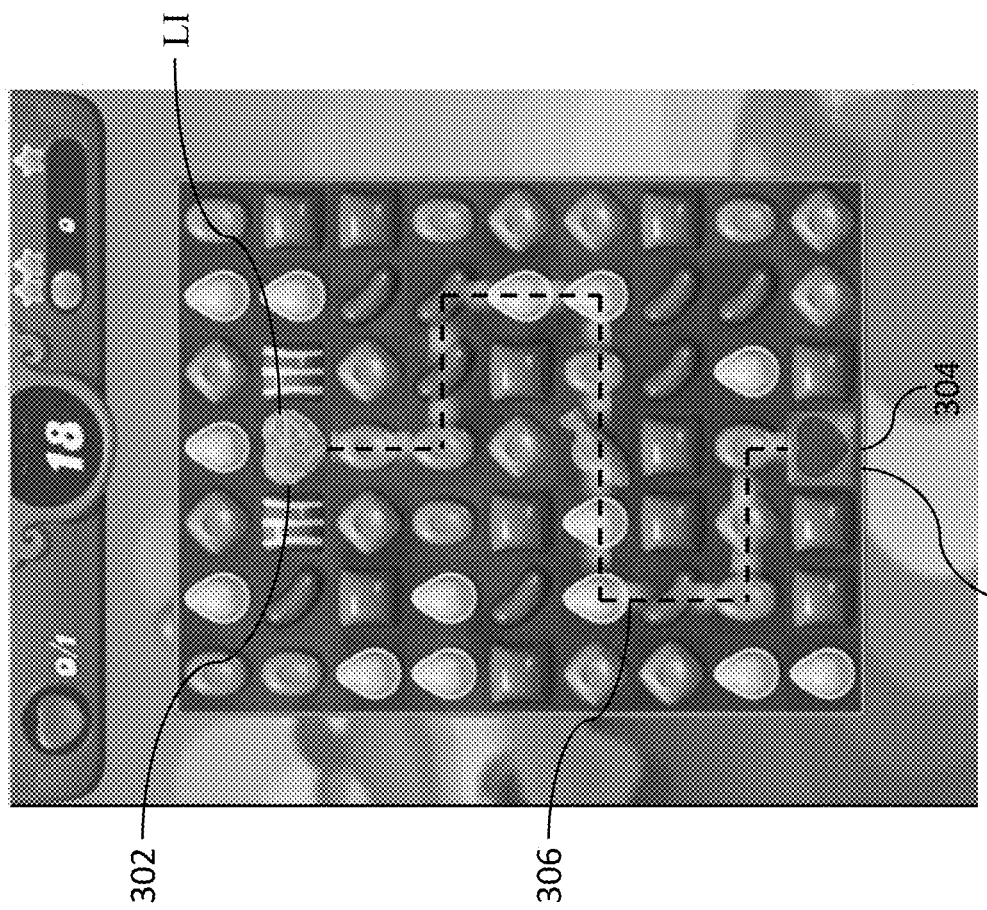
FIG. 3 shows an example game level and illustrates a path, a path follower element, and a target element.

FIG. 3 shows an example game board depicting a level of a match-3 game. A path follower object 302 is shown on the game board. In this example the path follower object 302 is a purple heart shaped object. The path follower object 302 is shown occupying a tile of the game board at an initial location LI. A target object 304 is also shown occupying a tile of the game board at a target location LT. In this example the target object 304 is a square with a heart shaped hole in the centre. Target objects are optional—the features offered by the path follower object may be manifest without a target object.

Between the path follower object 302 and the target object 304 (when present) is a pre-determined path 306. If no target object is present the predetermined path ends at an end location. The pre-determined path 306 is illustrated on the game board by a white translucent dashed line. In the example shown a black dashed line has been added over the translucent path to more clearly indicate its location on the game board. The pre-determined path may alternatively be hidden from a player, but nevertheless is defined in the game code for managing the behaviour of the path follower object.

The path follower object 302 moves along the pre-determined path 306 during game play in a step by step fashion, towards the target object 304. The player of the game may be presented with causing the path follower object 302 to reach a target object 304 as an objective to be achieved. Alternatively, properties of the path follower object may be used to assist in game play as described later. The path 306 to be followed by the path follower object 302 is pre-determined and forms part of the design of the level implemented by the game designer.

The path follower object 302 takes steps along the path 306 in response to events which interact with it. One such event is a match being made in adjacent tiles of the game board. That is to say that a match created on the game board which involves at least one game objects at a tiles next to the path follower object 302, in any direction (e.g. above, underneath, or beside), may contribute to the number of steps the path following object 302 may take along the path in a given move.

A user may create a match by interacting with a user actuatable game object to switch its position with an adjacent object as his move. The matching objects are removed and replaced according to the normal refill mechanism. New matches or other events may occur as a result of refill, and a new displayed board is presented when the objects have stabilised i.e. the game created chain reaction ends. However, a user may not yet be able to interact with this displayed game board, because the game mechanism associated with the path follower object needs to be processed before a next game board ready for a next user move is displayed.

A count is kept of how many adjacent matches or other interacting events are detected in the chain reaction following the user move. Once the game elements on the game board come to rest, e.g. once any cascade matches and board refills required as a consequence of a move have been completed, a process to move the path follower object 302 begins. That process is described later, but involves a step by step movement for an allocated number of steps along the path 306. A single step correlates to moving from one tile to its adjacent tile along the path. In the next game board presented to the user, the path follower object is at its attained location LN which depends on the number of allocated steps it has moved.

The path 306 may be of any shape on the game board. That is to say that the path 306 may have any number of turns or loops as it progresses from the initial location origin to its target endpoint.

The path 306 may be animated such that a subtle movement e.g. an undulating or flashing effect, can be seen by the player. This animation may be used to help distinguish the path from the background and other elements present on the game board. The animation may be especially helpful in cases where the indication of the path is rendered transparent so as not to obscure other elements on the game board (as in the example shown in FIG. 3).

The path 306 may be represented on the board in white, red, blue, yellow, etc. The path need not be a dashed line, and may be represented by a solid line, a patterned background to specific tiles, or any other visual indication which may be used to distinguish the tiles of the game board which coincide with the path 306 from those tiles which do not coincide with the path 306.

The path 306 the path may be opaque (i.e. the path may not be transparent). Such a path may be shown underneath the normal game elements which occupy the tiles of the game board.

The path 306 need not be visible on the game board to the player of the game. It may not be necessary for the player to know where on the game board the path follower object 302 will move to next. The objective of the level may simply be to keep the path follower object 302 moving until it reaches an endpoint, and thus the route taken may not be important for obtaining the objective.

The target object 304 if present at the endpoint of the path, need not be visible to the player. No target object needs to be present; the path may instead end at the edge of the game board, or within a designated area of the game board (e.g. having passed through a number of blockers or reached a particular structure within the level etc.).

FIG. 4A shows a game board after the path follower object has moved a number of steps along the path since FIG. 3.

FIG. 4A shows the game board just after an adjacent match has been made in the column to the right of the path follower object 302. The location of the match is indicated by a box 402. The path follower object 302 can be seen to have changed appearance as a consequence of the adjacent match. In the example shown, the path follower object 302 becomes cracked in appearance as a result of an adjacent match having been made. The red candies of the match are removed.

FIG. 4B shows the game board after refill as a result of the match shown in FIG. 4A. It can be seen that a further adjacent match 404 involving yellow teardrop shaped candies has been formed at a similar location to the previous match 402. These yellow candies moved ('fell') down to replace the removed red candies. Cascade matches such as this may occur in a chain reaction on the game board around the path follower object 302 until the game board comes to rest. Refill occurs as normal during this time. Note that the path follower object 302 remains stationary during refill. It is not removed when a match occurs, nor does it participate in match conditions. The game elements which refill the gaps on the game board move around the stationary path follower object 302 to reach any gaps (see FIG. 8A for an example of how the game elements move around the path following object 302).

Game elements may be involved in matches, but this is not necessary to define an interacting event. An interacting event is a match involving at least one game element adjacent to the path follower object.

Figure 4D:
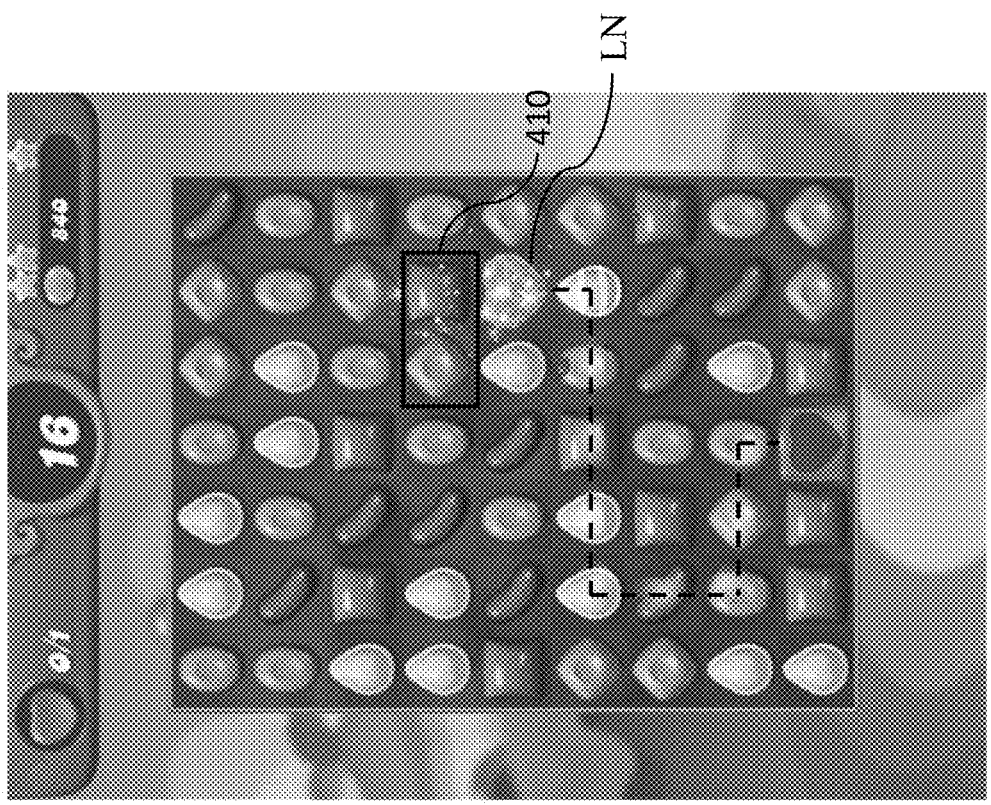
FIGS. 4C and 4D illustrate the crushing of game elements in front of the path follower element and an example of refilling the space behind the path follower element by spawning respectively.
Figure 4C:
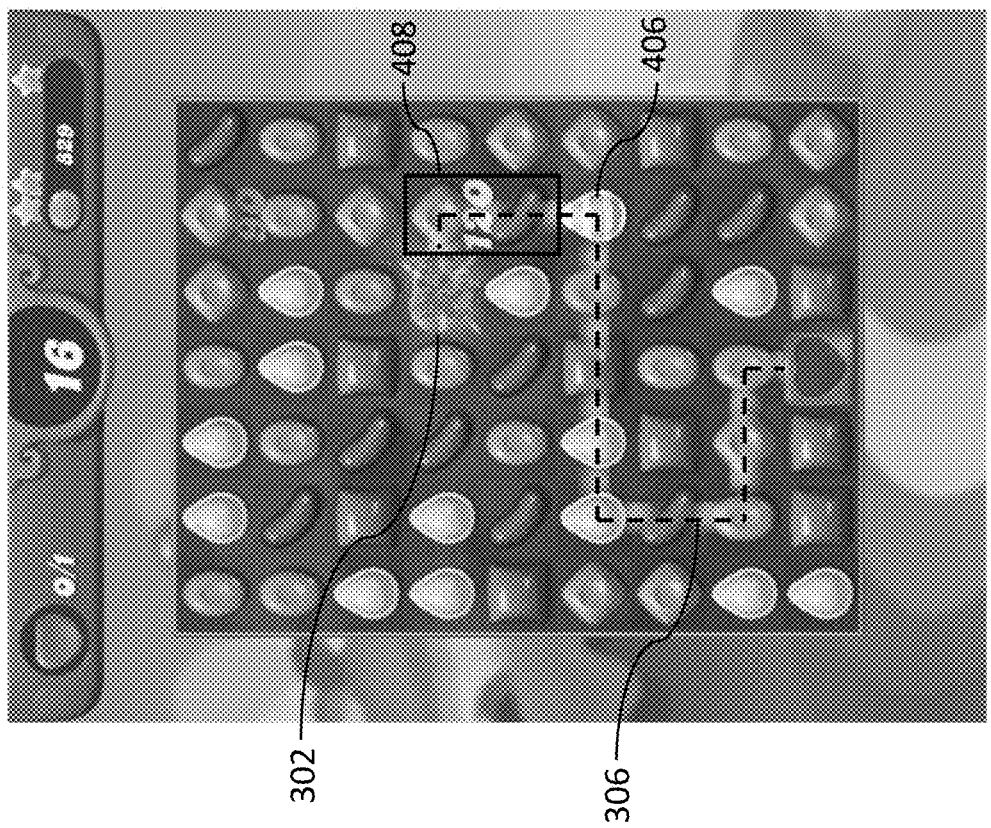

FIG. 4C shows the game board after the second adjacent match 404 has been made, the matching candies having been removed from the game board and replaced by a special striped candy 406, a red candy shown in box 408. The game board refills from above. The appearance of the path follower object 302 has changed again to indicate another match.

The appearance of the path follower object 302 has changed again to indicate it is about to move. In this example the purple heart 302 has become cracked on its surface to greater degree than it did in response to the previous adjacent match in FIG. 4A. The appearance of the path follower object 302 helps to indicate to the player the distance along the path 306 the path following object 302 can be expected to travel, e.g. how many steps along the path 306 the path follower object 302 currently has the power to move. The game board of FIG. 4C has come to rest, and no more matches exist within the move.

Now the path follower object's movement is processed. A check is made to see if it has been allocated any steps. In this case, it has two steps. It moves one step along the path, removes the game object at its new location and a new game object is 'spawned' behind it in the place it has left. As described more fully later, a check is made as to whether the removed game object has any effects to be triggered.

FIG. 4D shows the path follower object 302 having moved two steps along the path 306 to its attained location LN. The number of steps (2) along the path 306 correspond to the number of adjacent matches made within the previous move. The appearance of the path follower object 302 returns to the original appearance (as in FIG. 3) indicating that the path follower object 302 is not able to move any more steps along the path 306 at this time. The path following object may be thought of as an object which becomes charged when subject to an event such as an adjacent match.

When the path follower object moves along the path 306 game elements along path are removed (destroyed). In FIG. 4C, the red and blue candies in box 408 have been destroyed. In the process of destroying a game element any special feature of the game element may be triggered so as not to deprive the player of the benefit of that special element. For example a special candy which results in a bomb blast may be removed from the game board by the path following object 302, but the bomb blast effect may also be activated. Normal refill will occur in the vicinity of the bomb blast, and cascading matches may occur as a consequence of refill after the special feature activation.

In one embodiment, interacting events may be detected and rewarded to contribute to the moving steps of the path follower object along such a chain section. In that case, a next game board is not offered to a user to conduct a next move until the path follower has run out of steps to move.

As the path follower object 302 moves along the path 306, the gap left on the game board behind the path follower object 302 receives a new game object. However, the gap on the game board along the path 306 left by the path follower object 302 is not refilled as per the normal game physics. That is to say the gap left by the path follower object 302 is not filled by the dropping down or moving across of the candies into the gap with new candies entering at the edge of the game board. Instead, an instantaneous spawning of a new game element is used to fill this gap. This can be seen when comparing FIGS. 4C and 4D. The two steps moved by the path follower object 302 has resulted in the destruction of the two candies in box 408 in front of the path follower object 302 in FIG. 4C. The blue and green shaped candies in box 410 shown in FIG. 4D have spawned in the gaps left by the path follower object 302 and the blue candy 408 respectively. The surrounding game elements outside of those directly affected by the movement of the path follower object 302 have not moved or changed.

The game code selects suitable replacement game elements to be spawned. Game elements which are spawned to fill gaps left by the movement of the path follower object 302 may be selected so that a match is not created by the spawned game element(s). That is to say when the spawned game element fills the gap it does not instantly cause a match to be made.

The path follower object 302 does not form part of a match. That is to say the path follower object cannot be matched with other game elements on the board. Nor can the path follower object be swapped or moved like other game elements in order to create a match. The path follower object remains in a fixed position on the board unless caused to move a number of steps along the path 306 in the above described way.

Figure 5B:
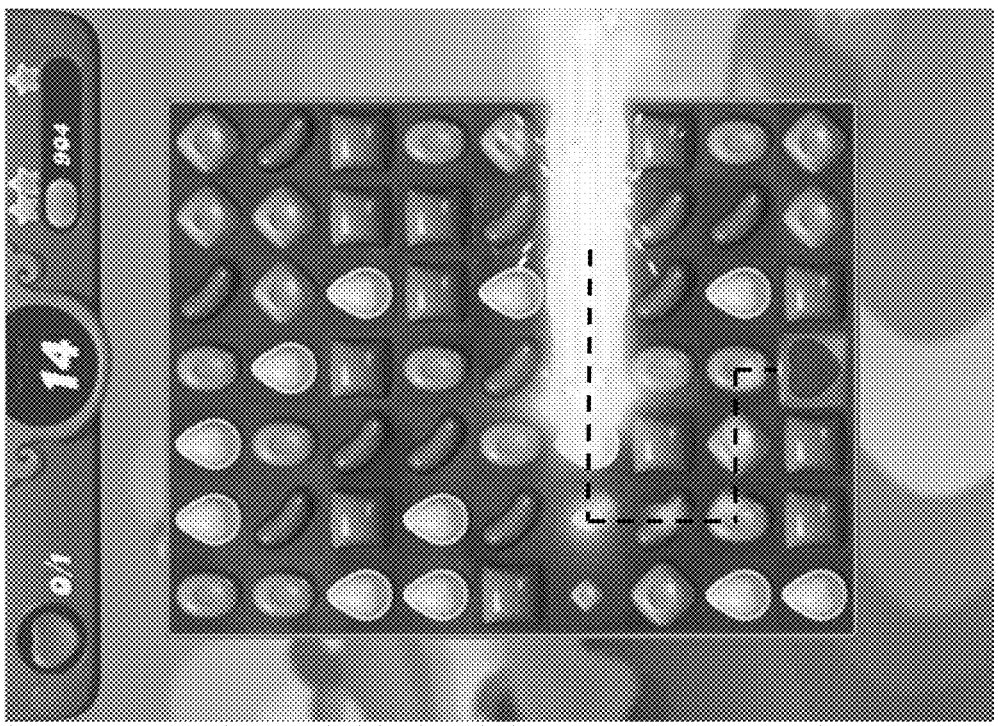
FIGS. 5A and 5B illustrate the moving of the path follower element along the path and the triggering of a triggerable effect respectively.
Figure 5A:
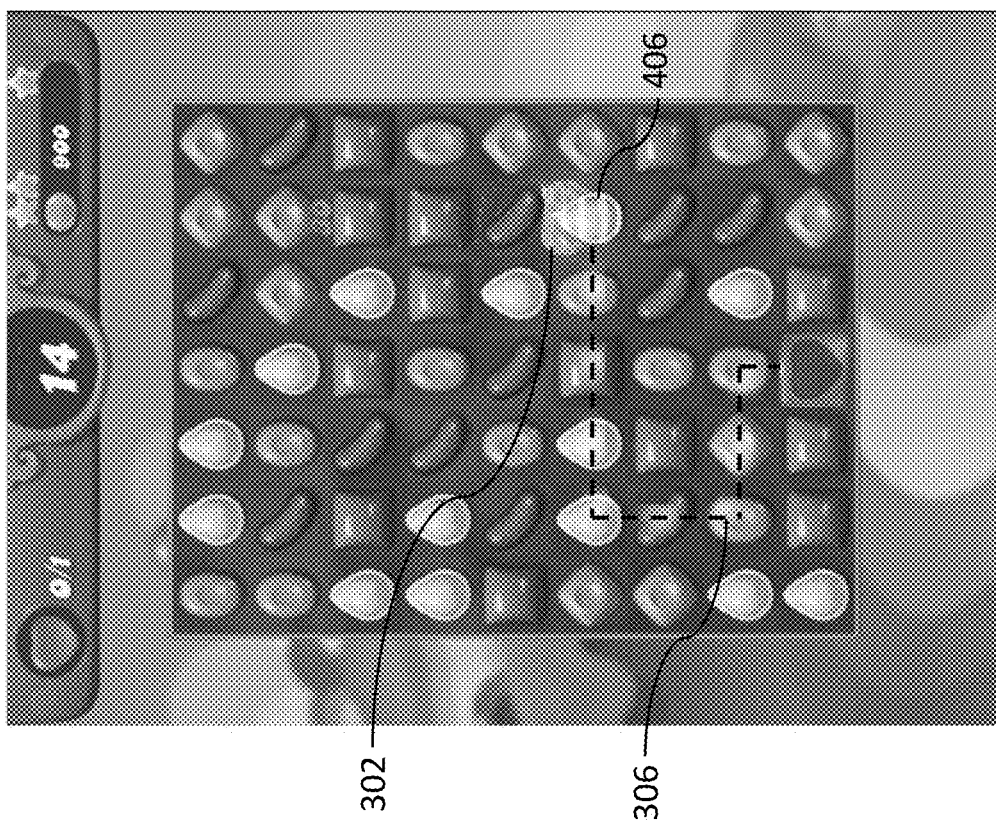

FIG. 5A shows the path follower object 302 having moved one step along the pre-determined path 306 as a result of a further adjacent match (the specific match is not shown). In doing so the path follower object 302 collides with the special candy 406 shown earlier in FIG. 4C. Collision of the path following object 302 with a special candy activates the special candy. In this example the special candy is a line/row blast.

FIG. 5B shows the special candy 406 having been activated and the resulting line blast. If the path follower object 302 is hit by a result of such a special feature (e.g. the path follower object 302 is in the way of a line blast or column blast), the interaction may be counted as an event for establishing the number of steps the path follower object 302 is able to take along the path 306.

Figure 6A:
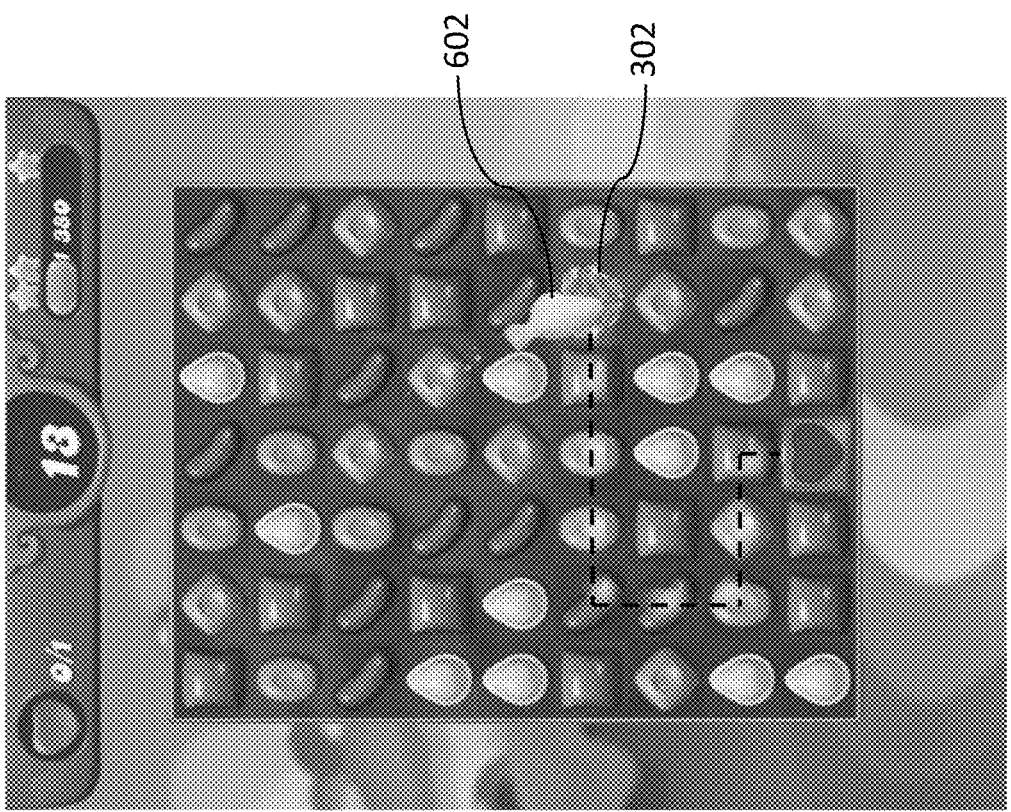
FIGS. 6A and 6B illustrate the liberating of a jelly fish from the game board, and the interaction of the jelly fish with the path follower element.

FIG. 6A shows the liberating of a yellow jelly fish 602 from the game board as a result of a match involving yellow teardrop candies elsewhere on the game board. In the known Candy Crush game jelly fish move towards game elements and game objects on the game board in a prioritised order. In embodiments, when a path follower object is present, this may have a high priority for attracting a jelly fish.

Figure 6B:
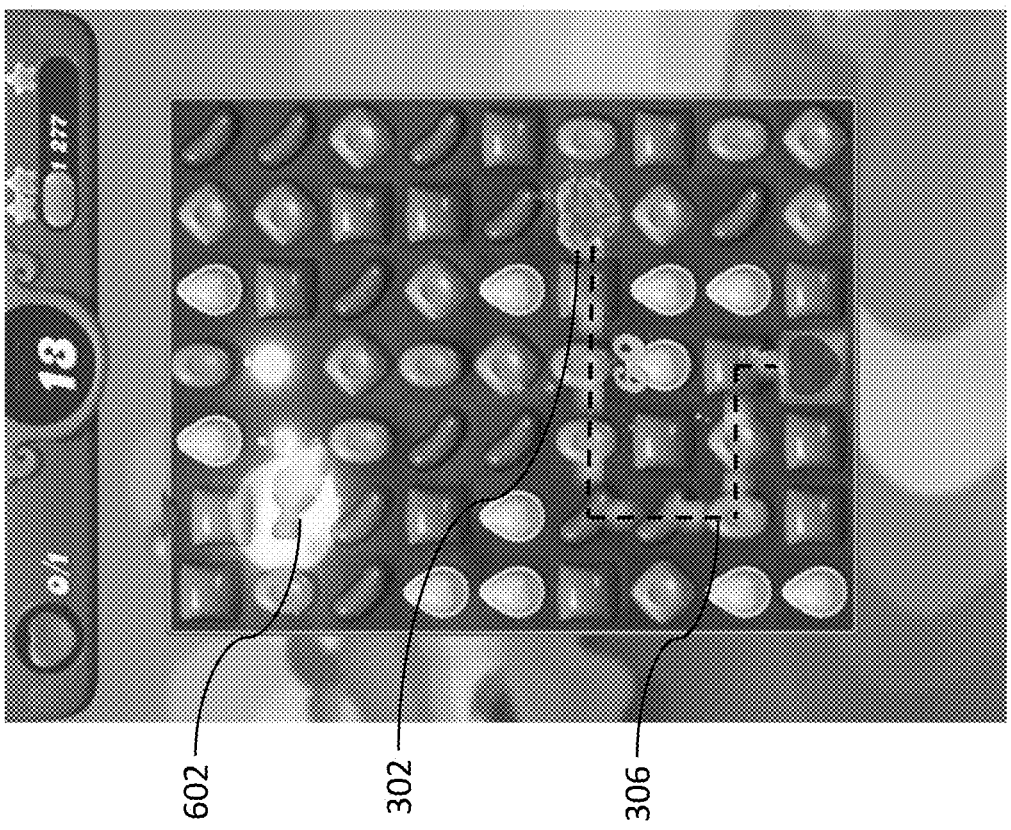

FIG. 6B shows the jelly fish 602 having moved ('swum') towards the path follower object 302. The path follower object 302 interacts with the jelly fish 602 such as to remove the jelly fish 602 from the game board. The interaction with this special candy effect (and similarly other special candies or their resulting effects) may also count as an event towards the number of steps the path following object 302 can make at the end of the current move.

Figure 7:
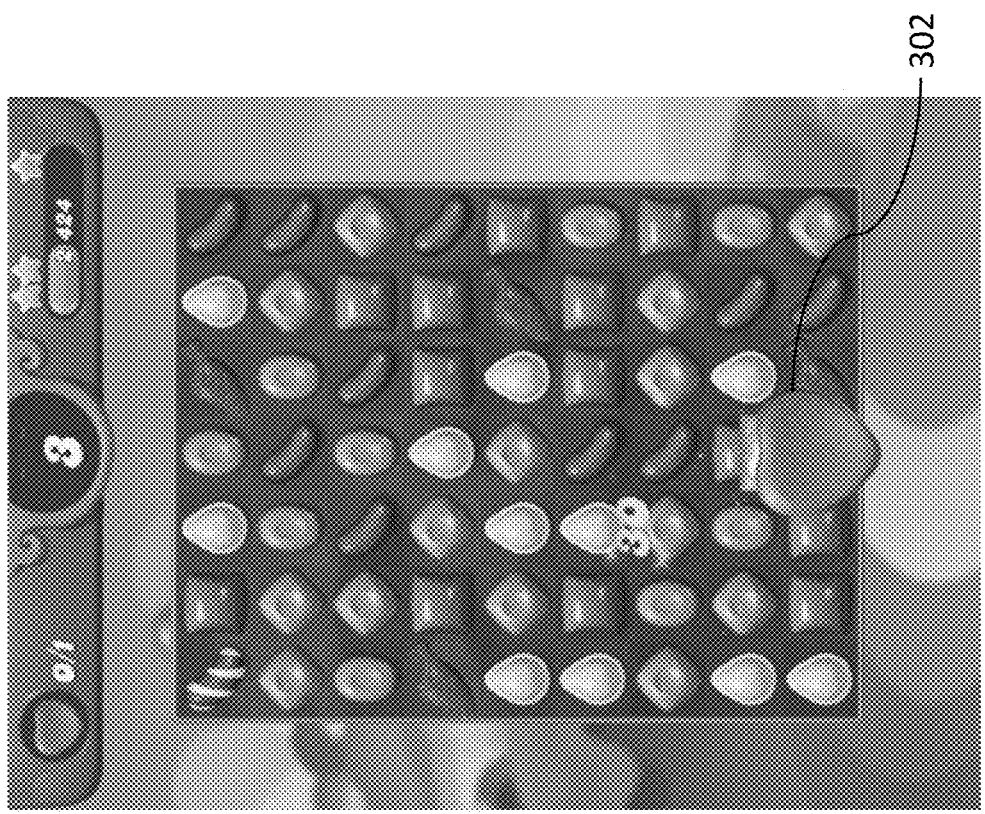
FIG. 7 illustrates the path follower element reaching the target element.

FIG. 7 shows the game board a number of moves later. The path follower object 302 has reached the target object 304. The level in this example has been completed and the objective set for the player has been achieved. Achieving the path following objective, e.g. by moving the path following object 302 along the path 306 to the target object 304, may result in a number of outcomes. For example, the outcome may be the end of the level, a reward being given to the player, or another outcome providing an incentive to the player to complete the objective. The reward may be in the form of a number of points added to the player's score, a number of moves added to the remaining moves total, or an item (e.g. a life, a booster, or another useable item). The item may be used within that specific level or at a later time within the game as a whole.

FIGS. 8A-8E show a cascade match around the path following object 302.

Figure 8B:
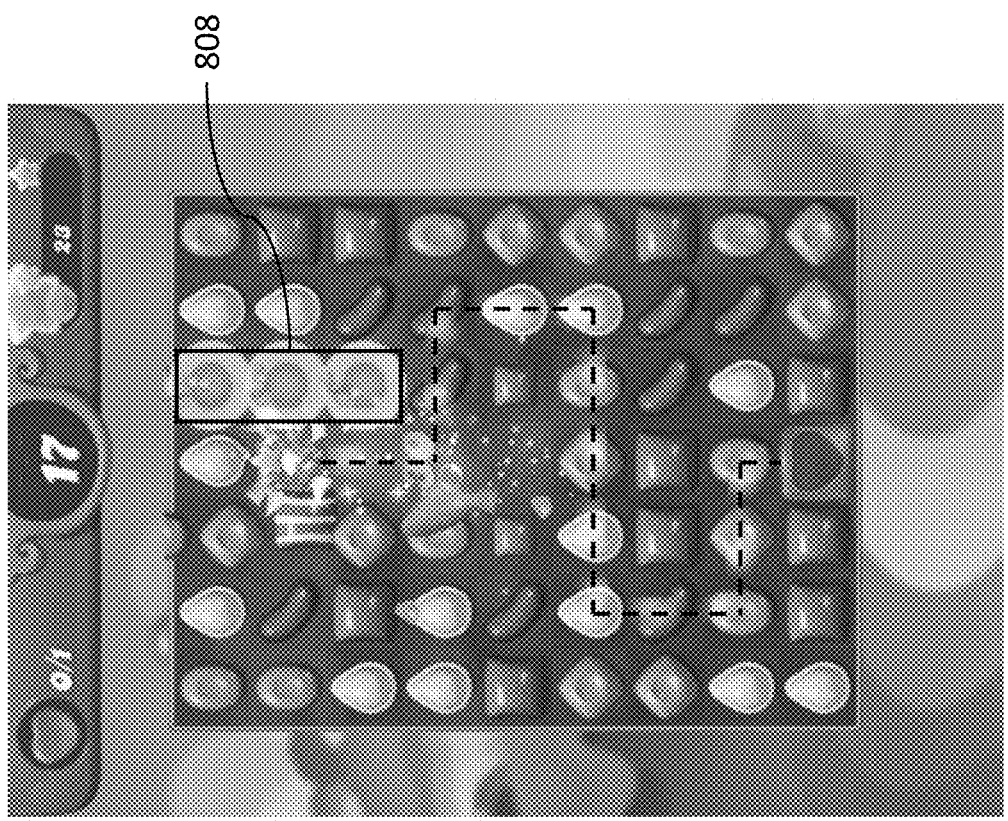
FIG. 8A-8E illustrate a cascade match around the path follower element.
Figure 8A:
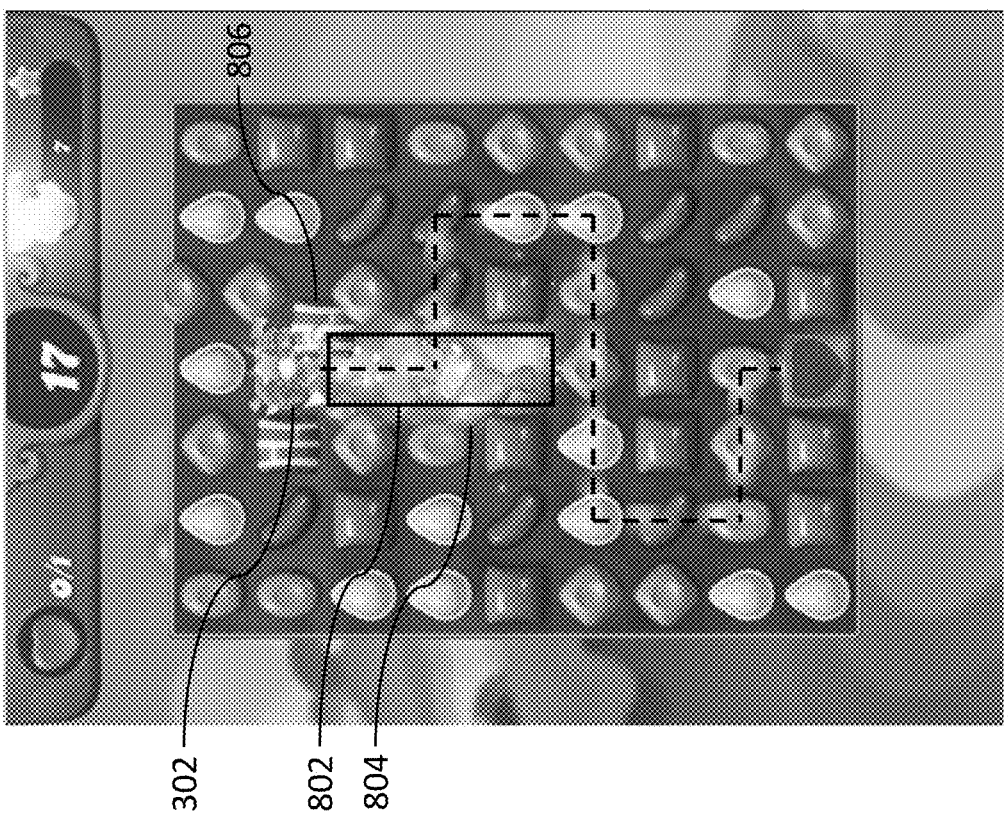

FIG. 8A shows the game board after an orange match 802 has been made in the column directly below the path following object 302. The match includes a jelly fish 804 which is then liberated and able to travel ('swim') across the game board.

The path follower object 302 has a changed appearance to indicate that the match will result in the path follower object 302 moving a step along the path 306.

Candies can be seen to be falling down during the resulting normal refill action. A special candy 806 in the form of a green square striped candy passes between the path follower object and a stationary blue diamond candy to help fill the gap underneath the path follower object 302 left by the match 802.

FIG. 8B shows a second match 808 involving three blue diamond candies in the adjacent column to the right of the path following object 302. The second match 808 is formed as a result of the refill carried out in response to the previous match 802, thus starting a cascade of matches.

The appearance of the path following object 302 changes appearance to indicate it has been 'powered' by the second match 808 which has contributed to the number of steps the path following object 302 will move.

Figure 8D:
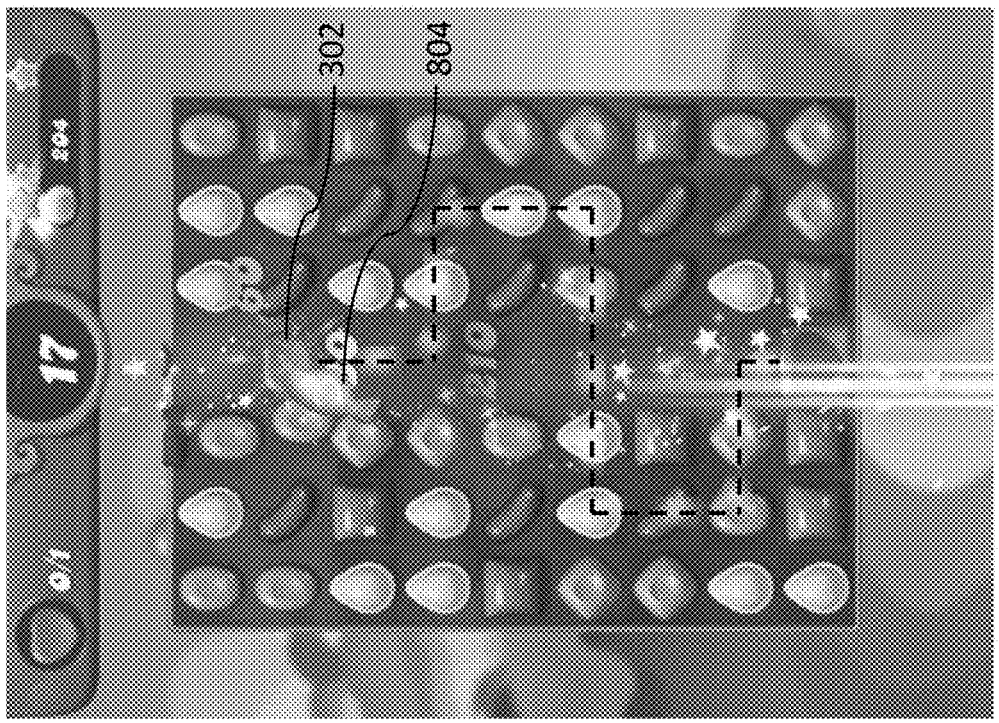
Figure 8C:
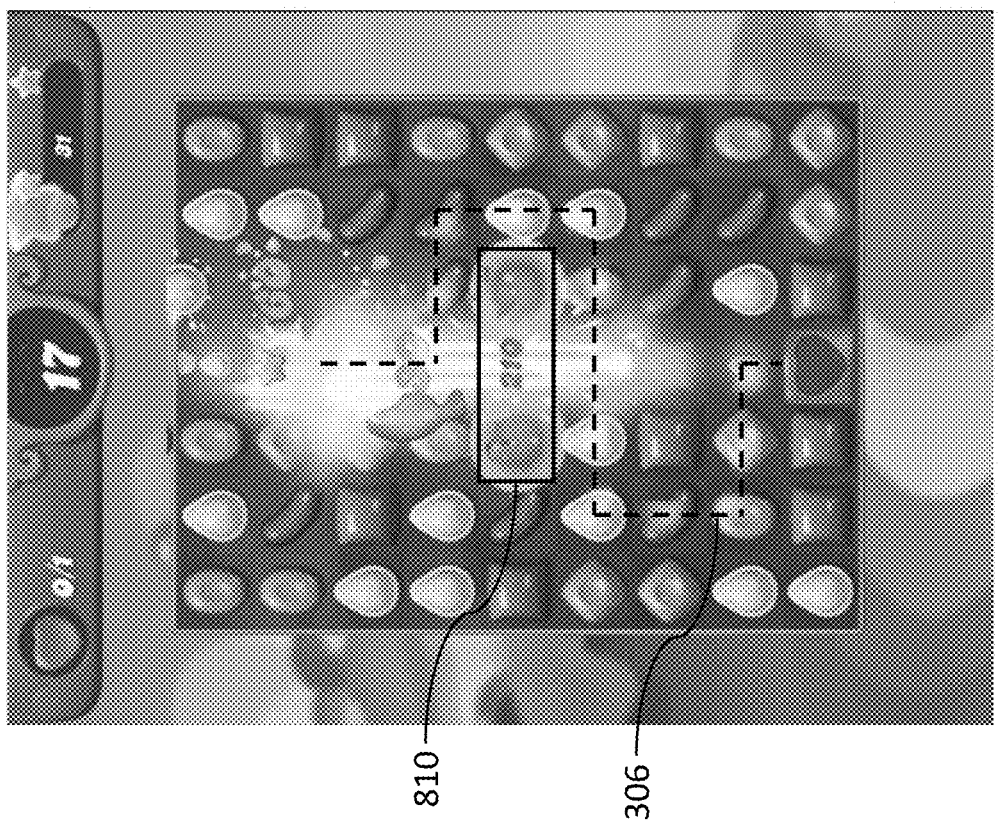

FIG. 8C shows the game board after the special candy 806 has fallen to the bottom of the gap on the game board left by match 802. The special candy 806 consequently forms a match 810 with two other green square candies in a line of the game board. The match 810 involving the special candy 806 activates the column blast effect of the striped candy. The column blast hits the path follower object 302. In the presently shown example the interaction with the special game element effect counts as an event towards the number of steps the path following object 302 is able to travel along the path 306 at the end of the move.

FIG. 8D shows the jelly fish 804 which has travelled across the game board towards the path following object 302. This is a result of the path follower object being a high priority object in this example, which the jelly fish 804 may preferentially move towards over other lower priority game elements on the game board. The jelly fish 804 will be absorbed by the path follower object 302.

The path follower object 302 has changed appearance after the column blast effect. In this example the appearance has changed such that all the cracks previously shown in increasing amounts for each interacting event have disappeared. This indicates to the player that a maximum number of steps has been accumulated by the path follower object 302. That is to say, any further interacting events will not increase the number of steps the path following object 302 will move along the path 306 at the end of that specific game move.

The maximum number of steps travelled by the path following object 302 within one move can be set to any appropriate number. In the example shown the maximum is three steps, but this may be set to four, five, six, or any appropriate number as chosen by the game developer. The maximum may change between levels depending on the design of the level.

Different events may contribute different amounts to the ability of the path follower object to move. For example, interaction with the effect of a special candy may contribute to the number of steps the path follower object 302 may travel along the path 306 more than an adjacent match. For example, a match adjacent to the path follower object 302 may result in one step being added to the running total of steps of the path follower object, whereas being hit by the effect of a special candy may result in two steps being added to the running total of steps of the path follower object 302. The number of steps the path follower object 302 can travel may not exceed the maximum number of steps allowed per move. Even if a special candy effect worth two steps hits the path follower object 302, the number of steps added to the existing number of steps the path follower object 302 may travel in that move may only be one step. For example, the total number of steps may only increase by one if the total prior to that interaction was one step below the maximum allowed.

Alternatively, all steps may be rewarded but when they are processed to cause the path follower object to move, a maximum is applied.

Figure 8E:
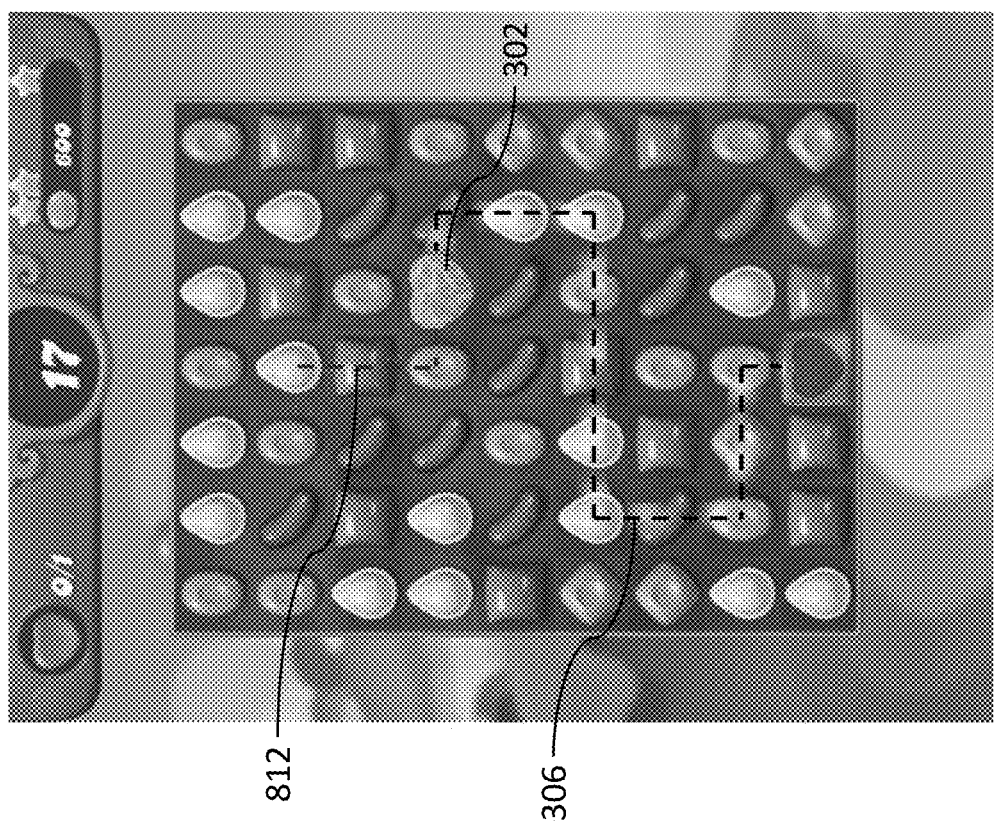

FIG. 8E shows the game board after the path follower object 302 has moved along the path 306. The number of steps moved is three, which is the maximum number of steps the path follower object 302 may travel in one move in this particular example. The three steps are indicated by the red dotted line 812. This is because the path follower object 302 reached the maximum of three contributing interacting events during the cascade of matches within that move. The number of events within the move was more than the maximum, but only three moves were meaningfully counted. This prevents cascade match events on the game board which, if all counted, would result in the path following object travelling all the way to the endpoint in one move.

Figure 9:
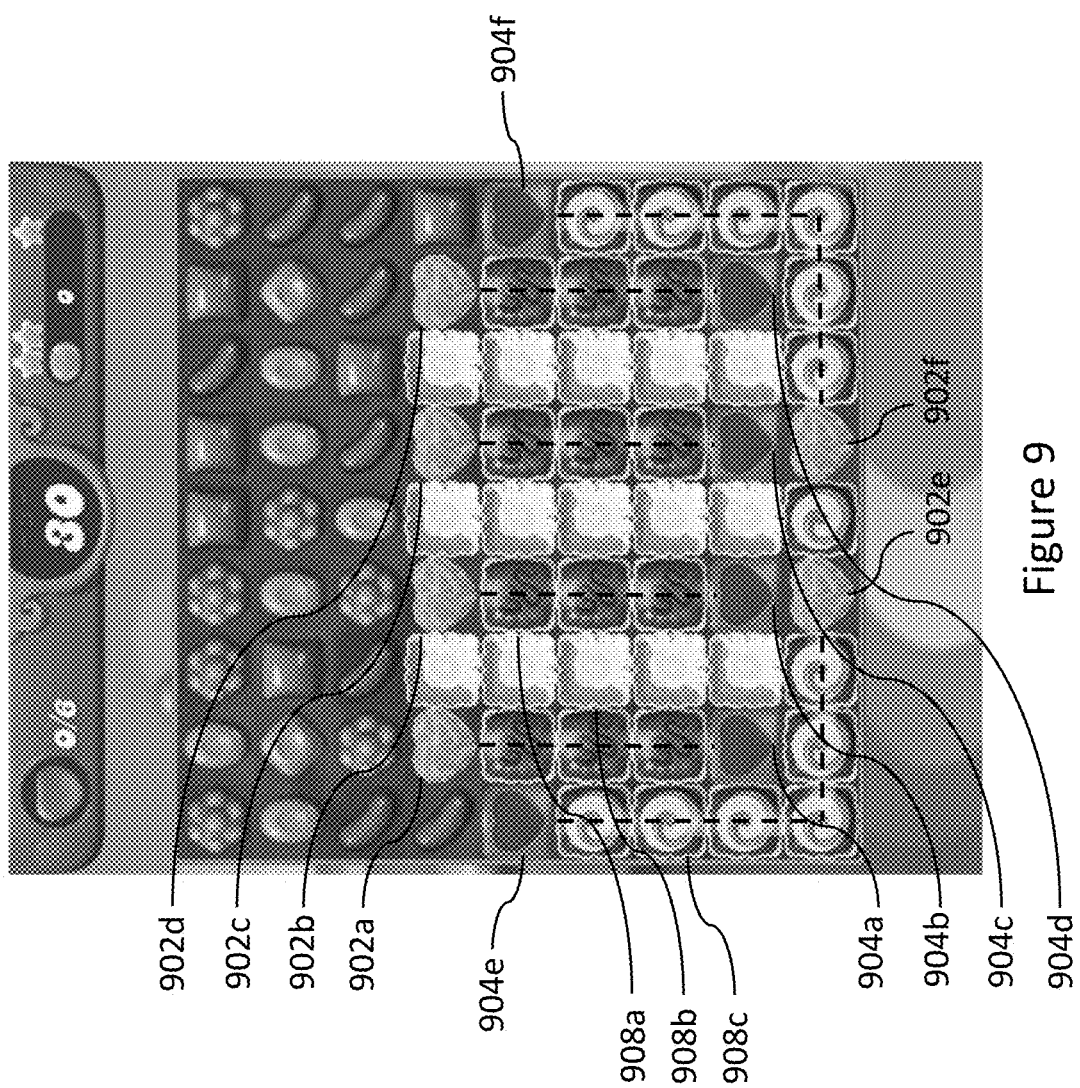
FIG. 9 illustrates an example level of the game comprising multiple blocker type game elements, multiple path follower elements, and multiple corresponding target elements.

FIG. 9 shows the game board depicting another, different level. The level includes multiple blocker type game elements 908a-908c. Levels may be designed such that multiple path follower objects exist on the game board at any one time. The game elements shown in FIG. 9 comprise multiple path follower objects 902a-902f. Each of these path follower objects has a corresponding target object 904a-904f and a corresponding path joining these objects.

Levels may be designed such that multiple path follower objects may travel along parts of a same path, along different paths to a common target object or endpoint, or a combination of these features, all of which may be used to create an interesting and entertaining level for the player.

Figure 10:
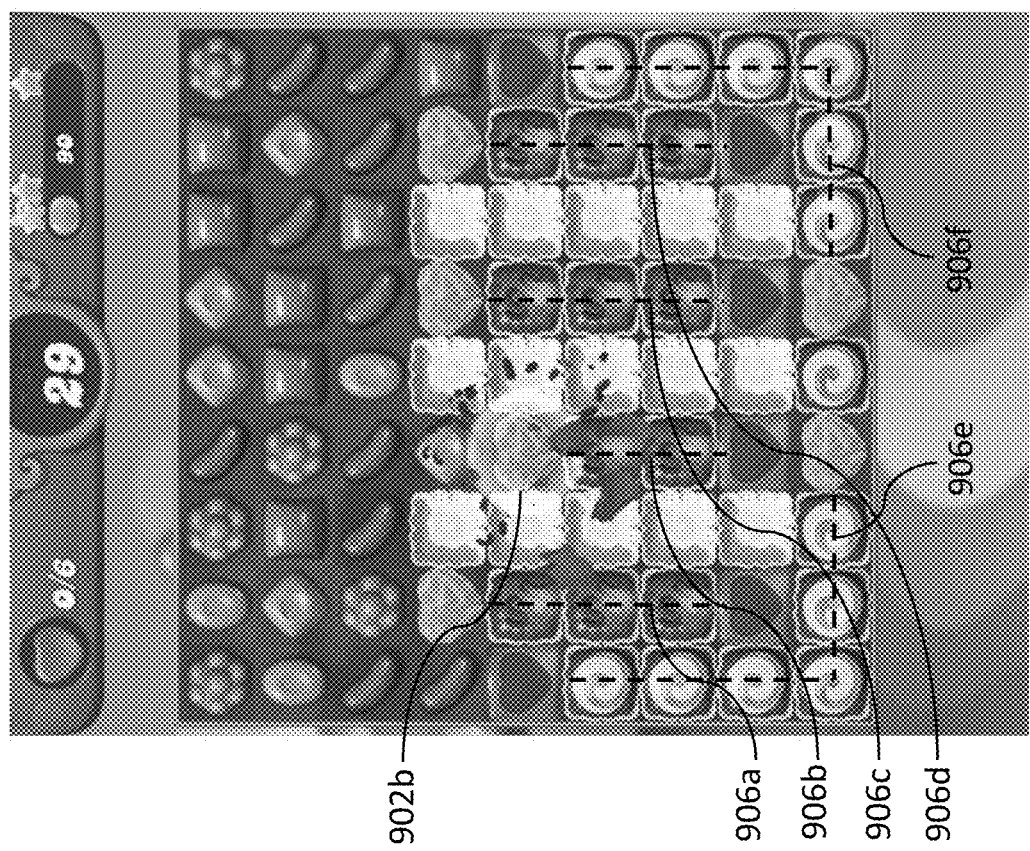
FIG. 10 illustrates the path follower elements removing any game elements in their path.

FIG. 10 shows the same game board as FIG. 9. The blocker type game elements, may require a number of adjacent matches before they can be removed from the game board. The path follower objects 902a-f will remove any game elements in their path as they travel along their path 906a-906f (shown with corresponding dotted lines). This may include removing blockers which may normally require more than one adjacent match to remove them from the game board. In this way the player may use a path follower object to remove game elements which may otherwise require a considerably larger number of moves or longer game time to remove, assisting the player in achieving the objectives of the level faster or using fewer moves. In FIG. 10 blocker 908a has been removed from the game board by the advancing path follower object 902b. A blue diamond candy has spawned in the gap left by the path following object 902b as it advanced.

Figure 11:
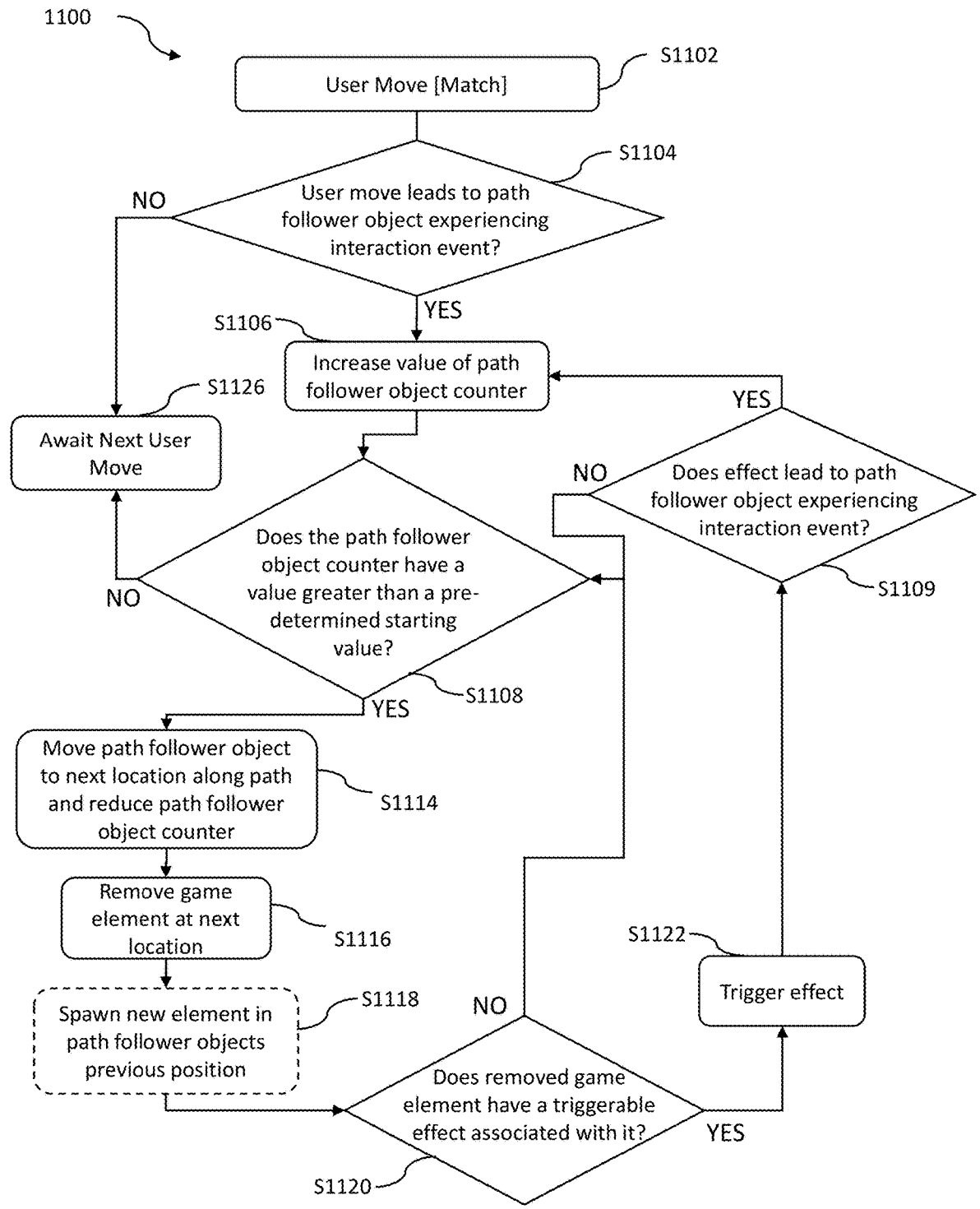
FIG. 11 shows a flow diagram depicting game logic for the moving of the path follower element along the path.

FIG. 11 shows a flow diagram depicting game logic for the progression of a path follower object along a predetermined path. The flow diagram illustrates a path follower object mechanic 1100, in which path follower moving steps are processed.

In step 1102 a user move is performed. The user move comprises the creation of a match on the game board. As a result of the match objects are removed from the board according to the normal game mechanic and normal refill of the game board occurs. In the following description of the path follower mechanic, it is noted that the logic flow is largely independent of the normal refill process. Refill of gaps on the game board is performed as per the normal logic of the game. Therefore where gaps occur on the game board due to the removal/movement of elements and other actions being played out on the board, the game logic will function as normal to fill these gaps via the normal refill mechanic. Therefore refill may be considered to be a separate piece of logic running in parallel to the path follower object logic.

At step 1104 it is determined whether the user move of step 1102 leads to the path follower object experiencing an interaction (or interacting) event. An interaction event is at least one of either the path follower object being adjacent to a match or the path follower object being impacted by the result of a match involving a special element e.g. a line blast. Examples of interaction events are described above in more detail. The interaction event detected at step 1104 may arise from any cascading matches and resulting special effects triggered on the game board as a result of the user move at step 1102.

If the answer to step 1104 is yes, the flow diagram moves to step 1106. The step of refill as a result of the user move may occur during or after step 1104, in line with the normal game logic. It may form part of the 'YES' or 'NO' branch exiting s1104.

At step 1106 a counter associated with the path follower object is incremented. The counter keeps track of how many interactions the path follower object has experienced within the current user move (e.g. prior to the next user move) and maintains a count depending on these interactions. The counter may be incremented only after the game board has stabilised, e.g. after all cascade matches and resulting refills or triggered effects have taken place and the game board has settled. Alternatively, the counter may be incremented each time a refill occurs on the game board within a cascade of matches or triggered effects. The interactions may have a weighting depending on the type of interaction. Thus the counter value may increase more as a result of one interaction than another interaction. For example, an adjacent match interaction may have a weighting of one, and result in the counter being increased by a value of one. However, where the path follower object is hit by a column blast the interaction type weighting may be set to two, and thus the counter is increased by a value of two. Once all the interactions have been accounted for by the path follower object's counter, the game logic moves to step 1108.

If the answer to step 1104 is no, the mechanic moves on to step 1126. In this case a match has been made sufficiently far away from the path follower object such that no interaction event is experienced, and only normal removal, triggering and refill has occurred. Step 1126 (await next user move) should be considered as the end point of the logic which controls the path follower object mechanic.

Step 1108 determines whether the path follower object's counter has a value greater than a pre-determined starting value. If there was no direct interaction with the path follower object as a result of the current user move then the counter will not have increased. As a result the path follower object will not move along the path and will not have a resulting effect on the game board. In this case the game logic moves on to step 1126. As discussed above, the move is played out with normal removal of game elements, normal refill of game elements, and normal triggered effects.

It should be understood that refill may appear to the player to occur before other moves on the game board, for example prior to the moving of the path follower object. However, refill may also appear to the player to occur simultaneously with the movement of other elements on the game board (e.g. alongside, that is to say at the same time as, movement of the path follower object along its pre-defined path). The refill of the game board may be done before the counter of the path follower object is incremented (see step 1106).

If the value of the path follower object counter is greater than the starting value, then the answer to step 1108 is 'YES', and the logic moves on to step 1114.

At step 1114 the path follower object moves one step along the path to the established next location on the path. The path follower object counter is then reduced. The reduction is a corresponding amount to that of the number of locations along the path moved.

The corresponding number of locations may have an associated ratio, such as a ratio of removing one value from the counter for moving one location along the path. Alternatively, another different ratio, for example a ratio of removing two values from the counter for moving one location along the path. Each move along the path to the next location may be done separately, where the resulting effects on the game board of each separate progression to the next location on the path are accounted for prior to the next progression of the path follower object. This can be seen in the following flow chart loop to steps 1116, 1118, 1120 and back to step 1108.

As a result of the path follower object moving along the path, the logic moves to step 1116, where the element occupying the next location is removed. That is to say, the game element occupying the next location into which the path follower object moves is removed. This game element is always removed upon moving the path follower object to that location. E.g. even game elements which usually take multiple game events to destroy are removed at once by the progression of the path follower object.

It should be appreciated that the actions in steps 1114 and 1116 may comprise a single step in the logic. For example, the removal of the game element at the next location, and the progression of the path follower object to the next location, may both be rendered to the user as though occurring simultaneously. Furthermore, it should be appreciated that the steps 1114 and 1116 may occur in the opposite order to that shown in the flow chart of FIG. 11. For example, the game element at the next location along the path may be removed (S1116) prior to the moving of the path follower object along the path (S1114).

In an embodiment, once the path follower object has moved along the path, the gap on the game board behind the path follower object may be filled by the spawning of a new game element in optional step 1118. This may be done to prevent normal refill behind the path follower object and potentially subsequent creating of uncontrollable cascades of matches and interactions with the path follower object. This allows the game element spawned in this gap to be selected by the game such that it does not create a match, and therefore greater control over the automatic progression of the path following object may be retained.

In another embodiment, refill behind the path follower object once it has moved to the next location along the path may be done via the normal refill mechanism. This may result in cascade matches and additional interaction events which contribute to the path follower object counter.

Similarly to the above discussion about the order of steps 1114 and 1116, step 1116 may occur after step 1118. That is to say, the removal of the game element at the next location may take place after the spawning of a new element in the path follower object's previous location on the path. Similarly again, steps 1114, 1116, and 1118 may appear to the player to occur simultaneously on the game board.

The logic then moves on to step 1120, where it is determined whether the removed game element has a triggerable effect associated with it. That is, does the path follower object interact with a special element as a result of the move along the path? If the answer is 'yes', the logic moves to step 1122. If the answer is 'no' the logic moves back to step 1108 to determine whether the path follower object counter is still of a value which would allow the path follower object to make further moves along the path. Prior to step 1108, but after step 1120, normal refill may also occur to account for any gaps on the game board created as a result of the triggered effect which did not result in an interaction event. This is because the triggering of an effect will still result in the normal removal of game elements, and thus refill may be required.

At step 1122, the effect associated with the special element which is interacted with is crushed as the path follower object moves is triggered. That is to say, the special element is activated by the path follower object and any resulting activity may subsequently or simultaneously be played out on the game board (e.g. normal removal and normal refilling of game elements). The logic then moves to step 1109.

Once the special effect of step 1122 is activated, any interactions with the path follower object as a result may also count towards the value of the path follower object counter. As such step 1109 accounts for any further interactions with the path follower object. That is to say at step 1109 the question becomes does movement of the path follower object along the path result in an effect being triggered which itself in turn leads to an interaction event?

If the answer at step 1109 is 'no' and no interaction event is experienced by the path follower object, the logic moves to step 1108. If the answer to step 1109 is 'yes', and an interaction event does occur, the logic moves to step 1106. Normal refill as a result of the triggered effect of step 1122 may be carried out before or after the question of step 1109 has been answered.

Step 1108 determines whether the value of the path follower object's counter has reached the pre-determined starting value again. This is, for example, as a consequence of the path follower object moving along the path and thus using the accumulated value of the counter (see removing of s1114) associated with the path follower object.

If the counter value is determined not to be greater than the pre-determined starting value the logic moves to step 1126. That is to say, for example as a result of using up the accumulated path follower object counter value, no more steps along the path are possible. The next user instigated move is then able to be made, and the game board is at rest until such a further user move is made.

If the counter value has not yet reached the pre-determined starting value, that is the path follower object still has the ability or power to move along the path, the logic moves to step 1114, where the path follower object moves to the next location along the path and the path follower object counter is reduced.

Figure 12:
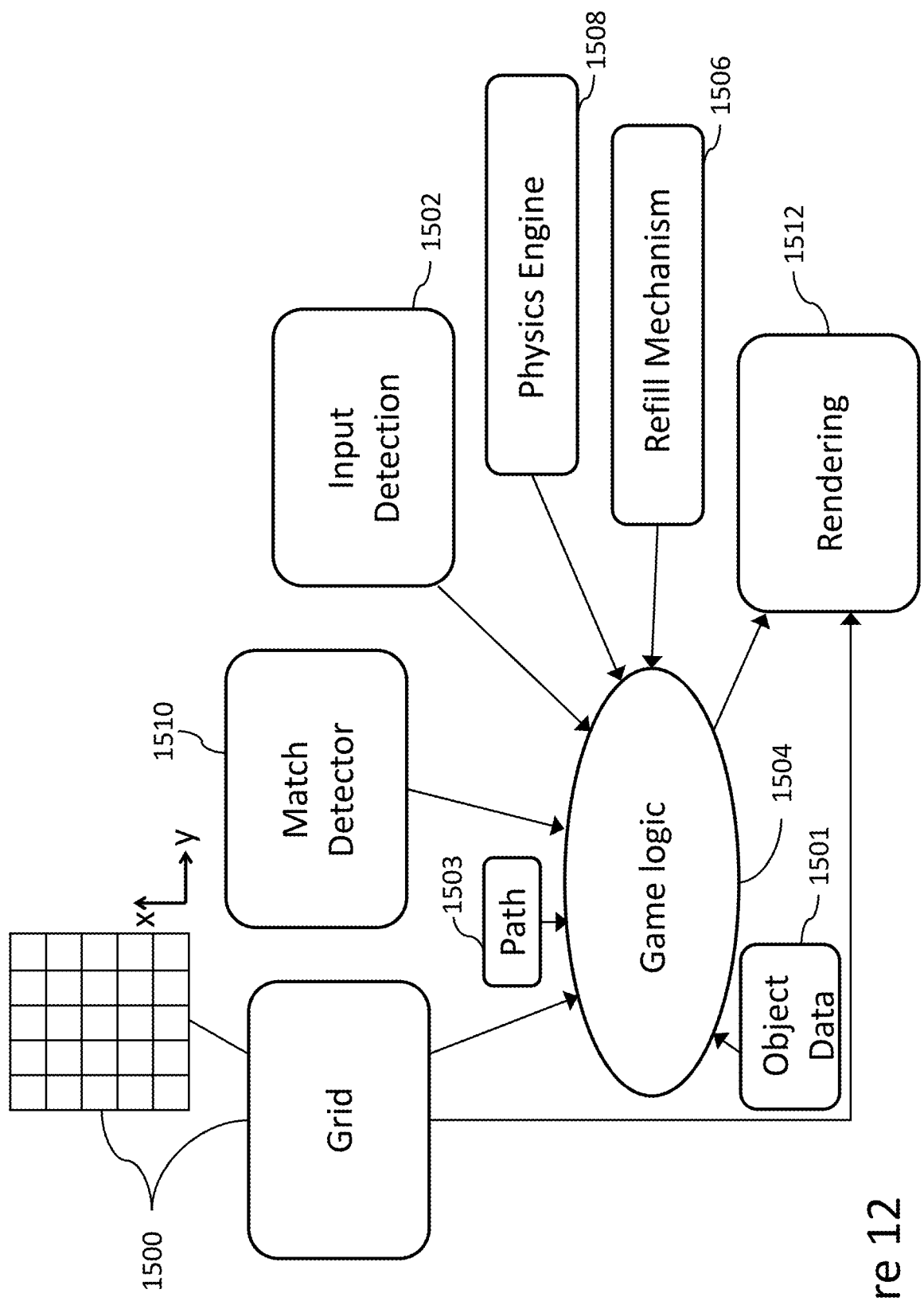
FIG. 12 is a schematic diagram of code components for controlling the display.

FIG. 12 shows a schematic representation of the functional blocks of an embodiment of the present invention used to enable game play such as that discussed above. Input detection 1502 captures the user input and feeds the input to the game logic 1504. The user input can be provided via any suitable user input device, such as those described above. The game logic 1504 will process the information provided by the user input. The game logic 1504 may then determine if a valid move has been made, and what the outcomes of such a move should be.

A grid component 1500 stored in a memory provides a grid representation of the game board as shown schematically in FIG. 15. The grid component can be supplied by any suitable data structure, held in local memory or remote memory accessible by the device, and is responsible for identifying each tile location on the game board and thus providing a tile ID with which to associate information about the game element displayed at that tile location. This associated information may then be used in combination with other components in order to control the rendering of the display, e.g. the match detector component 1510, and the refill mechanism component 1506.

Each game element has object data 1501 associated therewith. The object data may be stored in any suitable memory location. In some embodiments, the object data may be considered to be part of the game logic and in other embodiments may be considered to be outside the game logic. The object data may provide information as to the properties of a game element or block. These properties can include attribute information such as colour and/or whether or not a game element has a particular function such as a booster function. Path follower objects are identified by their associated properties, including their current location which may be updated each time a move is made. This predetermined path is also stored, for example defined as a chain of adjacent tile locations, in any suitable memory 1503.

The game logic 1504 will check if a game element satisfies the rule or rules for a valid match using the match detector logic 1510. The rule or rules may define whether or not certain match criteria have been satisfied. The specific conditions may be dependent on the particular game being played.

Thus, the game logic controls the rules for determining if a valid match is present or selected. The game logic will have access to data for each tile including its tile ID designating its location on the grid 1500, and associated tile data providing information about the contents of that tile, e.g. the game element within that tile or at least one characteristic associated with the game element within that tile. The game logic will thus be able to determine if a valid match condition has been met. If a valid match condition is met, the game elements in the match may be removed from those respective tiles. The grid can be considered as a map which may be used to determine the relative position of each tile on the game board from the tile ID. In embodiments of the present invention, the grid 1500 is implemented as a two-dimensional grid. The grid 1500 is shown with two dimensions x and y. However, any alpha numerical designation can be used as the tile ID. No logical relationship between tile IDs is required. However, the grid position relationship between tile IDs may be determinable from the tile ID alone, e.g. by using an array of tiles with numbered rows and lettered columns. The position of a game element may be either where the game element is or where the game element is going (e.g. the end point of a game element moving due to a refill). The location of the path follower object and the definition of the path may both be stored by reference to this tile grid structure.

The nature of the path and the location of the path follower object are determined by a designer of the game level. The path may be stored as part of the game level data as a chain of adjacent locations, represented by tile IDs on the grid. This data may be referred to as the path data. The location of the path follower object, that is its initial location, may be stored separately as part of the level design. This is referred to as the path follower location data. The next location, to which the path follower element is to move, is determined from the path data and the path follower location data.

The path follower location data is used to supply the data required for the start of the level, e.g. rendering the game board and the initial location of the path follower object. As the path follower object moves along the chain of locations forming the path, the path follower location data is updated. The next move of the path follower object can be determined using the known path follower location data and the path data. From this data it can be determined which tile ID is the next location in the chain, e.g. starting from the current location of the path follower object.

The path data may comprise end points. These end points may be represented as a designated start point and end point, or as the location of the path follower object (i.e. the path follower location data), and a designated end point (e.g. a final tile ID in a chain of tile IDs).

The previous locations of the path already traversed by the path follower object (i.e. the IDs of tiles of the grid which are now behind the path follower object) may be deleted from the path data. The path itself may therefore get shorter as the path follower object moves along it. In this way the path follower location data may always represent the start of the path and no separate location data for the path's start point needs to be stored. Thus the use of a reducing path length which always starts at the location of the path follower object can simplify the coding of the path. Further, there may be no need to indicate a direction of travel along the path, as there will only be one direction of possible movement along the chain of locations when the path follower object is always at the start of the path.

Alternatively, it is of course possible to maintain the full path, without removing locations from the path as they are passed. In this case the path follower object will move along the path, but the path will not change in length. It should be appreciated that there are also a multitude of other ways to implement the path data. For example, another implementation could be to maintain a pointer pointing to a memory element comprising the current or next position information in the chain of locations.

In the present examples, the game logic also determines that a tile has been vacated by movement of the path follower object and selects a new game element for that tile, prior to implementing a refill mechanism for the rest of the board. Once a match has been successfully made, these elements are removed and the respective tiles will become empty. At this stage a refill of the empty tiles is required based on the refill mechanism 1506. The refill mechanism may also have conditions on which it relies. For example, other moves or actions taking place on the game board may have to be completed before the refill mechanism can take place.

Each tile of the grid 1500 may be associated with data to indicate a status such as filled or unfilled (empty). Spaces which have been filled by 'spawning' behind the path follower are 'filled' before a refill operation starts. As part of the refill mechanism empty tiles are designated as the end point for particular elements. The physics engine component 1508 is configured to control the movement of moving game elements on the display. The physics engine 1508 may be part of the game logic 1504.

It should be appreciated that in other embodiments, the game may use any type of mechanic such as switching, sliding or linking. The game elements may be any suitable game element and in some embodiments may be letters. In that scenario a match will occur when the letters match a word.

The invention claimed is:

1. A computer device configured to provide a computer game responsive to user inputs, the computer device having:
    a user interface configured to display an initial game board of the computer game comprising user actuatable game elements and configured to detect user input of a first user move when a user engages with a game element, the user interface further configured to display a path follower element in an initial location;
    a processor configured to receive the detected user input of the first user move, to detect a match game condition of at least three adjacent matching user actuatable game elements caused by the first user move and to control the user interface to remove the at least three game elements from the display and provide on the user interface replacement user actuatable game elements; and
    a computer store holding tile data for each of a plurality of tiles supporting the game elements of the gameboard, the tile data designating a tile location of each tile on the gameboard,
    the computer store holding path data defining a predetermined path of the path follower element as a sequence of tile locations, wherein the processor is configured to render the predetermined path so as to be visually apparent on the user interface,
    wherein the processor is further configured to determine whether to trigger any events associated with the at least three removed game elements, to detect any interacting events which interact with the path follower element, and to allocate a number of moving steps to the path follower element based on the detected interacting events,
    the processor further configured to process the moving steps of the path follower element to cause the path follower element to move along the predetermined path defined by the path data, the processor configured, for processing a first one of the allocated number of moving steps, to display the path follower element at a next location along the visually apparent predetermined path, to remove from that location any game element at that location, to determine if there are any remaining moving steps allocated to the path follower element and (i) if so, to process a second one of the allocated number of moving steps or (ii) if not, to display the path follower element at its attained location on the visually apparent predetermined path.

2. The computer device according to claim 1 wherein the processor is configured, for processing each step, to display the path follower element at each next location prior to the attained location.

3. The computer device according to claim 1 comprising a counter which records the number of moving steps allocated to the path follower element as a result of the user move, and which is decremented each time the processor processes a step.

4. The computer device according to claim 1 wherein the processor is configured to determine for each game element removed from that location whether it is associated with a triggered effect and, if so, to trigger that effect prior to the next step.

5. The computer device according to claim 4 wherein the processor is configured to determine whether the game element removed from the path follower element's current location is associated with an effect to be triggered after the replaced game element has been generated in the space left by the path follower element, to trigger the effect if such an effect is detected, to detect any match game conditions created as a result of triggering the effect, to remove adjacent matching user actuatable game elements of the detected match game condition and to provide replacement user actuatable game elements using a refill mechanism prior to processing the next allocated step of the path follower element.

6. The computer device according to claim 1 wherein the processor is configured to select a replacement game element to be generated on the display in a space left by the path follower element after its move to its next location.

7. The computer device according to claim 1 wherein an interacting event comprises a match game condition of user actuatable game elements at least one of which is adjacent the path follower element.

8. The computer device according to claim 1 wherein the interacting event is created by game code executed by the processor which generates a direct interaction with the path follower element at its current location.

9. The computer device according to claim 1 wherein the processor is configured to allocated the number of moving steps to the path follower element corresponding to a count of the detected events.

10. The computer device according to claim 1 wherein the number of moving steps allocated to the path follower element is calculated based on the type and number of event, wherein events of different types have different weights contributing different amounts to the allocated number of moving steps.

11. The computer device according to claim 1, wherein the processor is configured to apply a cap to the number of steps allocatable to the path follower element per user move.

12. The computer device according to claim 1 wherein the processor is configured to access a maximum number of steps allocatable to the path follower element, and to display the path follower element at its location attained after the maximum number of steps, if the number of allocated steps exceeds the maximum number.

13. The computer device according to claim 1 wherein the processor is configured to determine if the game element removed from that location of the path follower element is associated with an effect to be triggered, if so to trigger that effect and to detect any further events which interact with the path follower element after the effect has been triggered, and if there are such further detected events to allocate a further number of moving steps to the path follower element to be processed prior to establishing the next game board ready for a next user move.

14. The computer device according to claim 1 wherein the processor is configured to change the visual appearance of the path follower element when subject to an interacting event.

15. The computer device according to claim 1 wherein the user interface is configured to display a target element at an endpoint location of the predetermined path.

16. The computer device according to claim 1 wherein the processor is configured to provide the replacement user actuatable game elements by a refill mechanism in which game elements adjacent the locations of the removed at least three game elements in a direction determined by a predetermined physics move into the spaces left after removal of the game elements, and replacement user actuatable game elements are refilled from an edge of the game board according to the predetermined physics.

17. A computer implemented method of controlling a user interface on a computer device responsive to user engagement with a displayed initial game board comprising user actuatable game elements and a path follower element displayed in an initial location, the method comprising the following steps implemented by a processor of the computer device:
  receiving a detected user input of a user move;
  detecting a match game condition of at least three adjacent matching user actuatable game elements;
  controlling the user interface to remove the at least three game elements from the display;
  providing on the user interface replacement user actuatable game elements;
  detecting events which interact with the path follower element arising as a result of the user move;
  changing the visual appearance of the path follower element when subject to an interacting event,
  allocating a number of moving steps to the path follower element based on the detected events;
  processing the moving steps of the path follower element to cause the path follower element to move along a predetermined path, wherein the processing for each moving step comprises:
    causing the path follower element to move to a next location along the path;
    removing from that location any game element at that location,
    determining that the game element removed from that location of the path follower element is associated with an effect to be triggered,
    triggering that effect,
    presenting a visualisation of the effect on the user interface,
    and detecting any further events which interact with the path follower element after the effect has been triggered, and if there are such further detected events allocating a further number of moving steps to the path follower element,
  determining if there are any remaining moving steps allocated to the path follower element and:
    (i) if so, processing the next step; and
    (ii) if not, displaying the path follower element at its attained location to establish a next game board for a next user move.

18. A non-transitory computer readable medium having instructions which when executed by a processor on a computer device cause the processor to:
  receive a detected user input of a user move;
  detect a match game condition of at least three adjacent matching user actuatable game elements;
  control the user interface to remove the at least three game elements from the display;
  provide on the user interface replacement user actuatable game elements;
  detect events arising as a result of the user move which interact with a path follower element displayed at an initial location on a user interface of the computer device;
  change the visual appearance of the path follower element when subject to an interacting event,
  allocate a number of moving steps to the path follower element based on the detected events;
  process the moving steps of the path follower element to cause the path follower element to move along a predetermined path, wherein the processing for each moving step comprises:
    accessing a computer store holding tile data for each of a plurality of tiles supporting the game elements of the gameboard, the tile data designating a tile location of each tile on the gameboard, the computer store holding path data defining a predetermined path of the path follower element as a sequence of tile locations,
    causing the path follower element to move to a next location along the predetermined path defined by the path data;
    removing from that location any game element at that location,
  determining if there are any remaining moving steps allocated to the path follower element and:
    (i) if so, processing the next step; and
    (ii) if not, displaying the path follower element at its attained location.

* * * * *